(12) United States Patent
Samadani

(10) Patent No.: US 12,450,426 B1
(45) Date of Patent: Oct. 21, 2025

(54) METHOD AND SYSTEM FOR CELLULAR COMPUTATION AND DISPLAY

(71) Applicant: Mehrdad Samadani, San Jose, CA (US)

(72) Inventor: Mehrdad Samadani, San Jose, CA (US)

( * ) Notice: Subject to any disclaimer, the term of this patent is extended or adjusted under 35 U.S.C. 154(b) by 29 days.

(21) Appl. No.: 17/555,471

(22) Filed: Dec. 19, 2021

Related U.S. Application Data

(60) Provisional application No. 63/215,713, filed on Jun. 28, 2021, provisional application No. 63/128,201, filed on Dec. 21, 2020.

(51) Int. Cl.
    *G06F 40/18*     (2020.01)
    *G06F 3/0481*     (2022.01)
    *G06F 40/111*     (2020.01)

(52) U.S. Cl.
    CPC ............ *G06F 40/18* (2020.01); *G06F 40/111* (2020.01); *G06F 3/0481* (2013.01)

(58) Field of Classification Search
    CPC ....... G06F 40/18; G06F 40/111; G06F 3/0481
    USPC .......................................................... 715/219
    See application file for complete search history.

(56) References Cited

U.S. PATENT DOCUMENTS

| | | | | |
|---|---|---|---|---|
| 5,255,363 A * | 10/1993 | Seyler | .................... | G06F 3/0489 715/219 |
| 6,460,059 B1 * | 10/2002 | Wisniewski | ............ | G06F 40/18 715/205 |
| 7,984,371 B2 * | 7/2011 | Zdenek | .................. | G06F 40/111 715/761 |
| 8,745,483 B2 * | 6/2014 | Chavoustie | ............. | G06F 40/14 715/218 |
| 9,158,832 B1 * | 10/2015 | Hiatt | ........................ | G06F 40/14 |
| 9,298,454 B2 * | 3/2016 | Tuvian | ...................... | G06F 40/18 |
| 9,959,098 B1 * | 5/2018 | Smith Devine | ......... | G06F 40/18 |
| 10,191,897 B1 * | 1/2019 | Olkin | ........................ | G06F 40/18 |
| 10,540,434 B2 * | 1/2020 | Migeon | .................... | G06F 40/18 |
| 10,664,652 B2 * | 5/2020 | Campbell | ................ | G06F 40/18 |
| 10,740,550 B1 * | 8/2020 | Bosworth | ............ | G06F 16/2282 |
| 11,550,778 B2 * | 1/2023 | Zarras | .................... | G06F 16/245 |
| 11,630,948 B1 * | 4/2023 | Kaptur | ..................... | G06F 40/18 715/219 |
| 11,836,444 B2 * | 12/2023 | Dvorak | .................... | G06F 9/451 |
| 2001/0007988 A1 * | 7/2001 | Bauchot | .................. | G06F 40/18 |
| 2002/0078086 A1 * | 6/2002 | Alden | ..................... | G06F 40/18 715/213 |

(Continued)

OTHER PUBLICATIONS

Markus Luckey, Martin Erwig, Gregor Engels, Systematic evolution of model-based spreadsheet applications, Journal of Visual Languages & Computing, vol. 23, Issue 5, pp. 267-286.*

(Continued)

*Primary Examiner* — Jeremy L Stanley

(57) ABSTRACT

Methods and systems for implementing computations in cellular units. The cells may be organized in various ways, including on a canvas, or in a grid. Aspects of these cells may be easily manipulated via user interface operations. A cell may contain program instructions, which may contain references to values computed by program instructions in other cells. Cells may be repositioned, split, or combined easily via user interface operations. A spreadsheet may be converted into, or extracted from, other cellular computations.

20 Claims, 18 Drawing Sheets

(56) References Cited

U.S. PATENT DOCUMENTS

| | | | | |
|---|---|---|---|---|
| 2005/0081141 | A1* | 4/2005 | Jonsson | G06F 8/34 |
| | | | | 717/116 |
| 2006/0069696 | A1* | 3/2006 | Becker | G06F 40/18 |
| | | | | 707/999.102 |
| 2006/0080594 | A1* | 4/2006 | Chavoustie | G06F 40/14 |
| | | | | 715/218 |
| 2006/0224946 | A1* | 10/2006 | Barrett | G06F 40/18 |
| | | | | 715/209 |
| 2007/0033519 | A1* | 2/2007 | Zdenek | G06F 40/18 |
| | | | | 715/234 |
| 2008/0209444 | A1* | 8/2008 | Garrett | G06F 40/18 |
| | | | | 719/320 |
| 2009/0228776 | A1* | 9/2009 | Folting | G06F 40/18 |
| | | | | 715/219 |
| 2012/0042242 | A1* | 2/2012 | Garland | G06F 40/111 |
| | | | | 715/256 |
| 2012/0137204 | A1* | 5/2012 | Petrovicky | G06F 40/18 |
| | | | | 715/219 |
| 2013/0067305 | A1* | 3/2013 | Golan | G06F 40/111 |
| | | | | 715/219 |
| 2013/0290822 | A1* | 10/2013 | Chen | G06F 40/174 |
| | | | | 715/212 |
| 2014/0013313 | A1* | 1/2014 | Eker | G06F 8/436 |
| | | | | 717/132 |
| 2014/0359417 | A1* | 12/2014 | Bar-On | G06F 40/18 |
| | | | | 715/212 |
| 2014/0372858 | A1* | 12/2014 | Campbell | G06F 40/18 |
| | | | | 715/220 |
| 2015/0019946 | A1* | 1/2015 | Zarras | G06F 3/04842 |
| | | | | 715/219 |
| 2015/0106782 | A1* | 4/2015 | Tuvian | G06F 8/76 |
| | | | | 717/104 |
| 2015/0169532 | A1* | 6/2015 | Otero | G06F 40/18 |
| | | | | 715/212 |
| 2017/0124142 | A1* | 5/2017 | Becker | G06F 16/2365 |
| 2017/0154026 | A1* | 6/2017 | Gong | G06T 11/206 |
| 2018/0203838 | A1* | 7/2018 | Hiatt | G06F 16/2246 |
| 2019/0197096 | A1* | 6/2019 | Hiatt | G06F 16/2246 |
| 2019/0213191 | A1* | 7/2019 | Shuster | G06F 16/24568 |
| 2019/0302976 | A1* | 10/2019 | Polson | G06F 3/0484 |
| 2019/0354613 | A1* | 11/2019 | Zoldi | G06F 16/2264 |
| 2020/0184149 | A1* | 6/2020 | Honsowetz | G06F 3/0482 |
| 2021/0081605 | A1* | 3/2021 | Smith | G06F 40/177 |
| 2021/0406458 | A1* | 12/2021 | Dvorak | G06F 3/0482 |

OTHER PUBLICATIONS

Dietmar Jannach, Thomas Schmitz, Birgit Hofer, Franz Wotawa, Avoiding, finding and fixing spreadsheet errors—A survey of automated approaches for spreadsheet QA, Journal of Systems and Software, vol. 94, pp. 129-150.*

Philip T. Cox and Trevor J. Smedley. 1994. Using visual programming to extend the power of spreadsheet. In Proceedings of the workshop on Advanced visual interfaces (AVI '94). Association for Computing Machinery, New York, NY, USA, 153-161. https://doi.org/10.1145/192309.192343.*

P. T. Cox, F. R. Giles and T. Pietrzykowski, "Prograph: a step towards liberating programming from textual conditioning," [Proceedings] 1989 IEEE Workshop on Visual Languages, 1989, pp. 150-156, doi: 10.1109/WVL.1989.77057.*

T. Igarashi, J. D. Mackinlay, Bay-Wei Chang and P. T. Zellweger, "Fluid visualization of spreadsheet structures," Proceedings. 1998 IEEE Symposium on Visual Languages (Cat. No.98TB100254), 1998, pp. 118-125, doi: 10.1109/VL.1998.706154.*

Hermans, Felienne F. J., Martin Pinzger and Arie van Deursen. "Breviz: Visualizing Spreadsheets using Dataflow Diagrams." ArXiv abs/1111.6895 (2011) (Year: 2011).*

Sousa, Tiago. Dataflow Programming: Concept, Languages and Applications. (2012) (Year: 2012).*

Leitão, Roxanne & Roast, C.R .. (2014). Developing visualizations for spreadsheet formulae: Towards increasing the accessibility of science, technology, engineering and maths subjects. CEUR Workshop Proceedings. 1186. (Year: 2014).*

Burnett, Margaret & Atwood, John & Djang, Rebecca & Reichwein, James & Gottfried, Herkimer & Yang, Sherry. (2001). Forms/3: A First-Order Visual Language to Explore the Boundaries of the Spreadsheet Paradigm. J. Funct. Program.. 11. 155-206. 10.1017/S0956796800003828. (Year: 2001).*

Hermans, Felienne & Pinzger, Martin & Deursen, Arie. (2011). Supporting professional spreadsheet users by generating leveled dataflow diagrams. Proceedings—International Conference on Software Engineering. 451-460. 10.1145/1985793.1985855. (Year: 2011).*

Trevor J. Smedley, Philip T. Cox, and Shannon L. Byrne. 1996. Expanding the utility of spreadsheets through the integration of visual programming and user interface objects. In Proceedings of the workshop on Advanced visual interfaces (AVI '96). (Year: 1996).*

Chen, Ying and Hock Chuan Chan. "Visual Checking of Spreadsheets." ArXiv abs/0805.2189 (2008): 11 pages. (Year: 2008).*

W. Dou, C. Xu, S. C. Cheung and J. Wei, "CACheck: Detecting and Repairing Cell Arrays in Spreadsheets," in IEEE Transactions on Software Engineering, vol. 43, No. 3, pp. 226-251, Mar. 1, 2017 (Year: 2017).*

B. Jansen and F. Hermans, "XLBlocks: a Block-based Formula Editor for Spreadsheet Formulas," 2019 IEEE Symposium on Visual Languages and Human-Centric Computing (VL/HCC), Memphis, TN, USA, 2019, pp. 55-63 (Year: 2019).*

Biermann, Florian & Dou, Wensheng & Sestoft, Peter. (2018). Rewriting High-Level Spreadsheet Structures into Higher-Order Functional Programs. (Year: 2018).*

J. Cunha, J. Mendes, J. Saraiva and J. P. Fernandes, "Embedding and evolution of spreadsheet models in spreadsheet systems," 2011 IEEE Symposium on Visual Languages and Human-Centric Computing (VL/HCC), Pittsburgh, PA, USA, 2011, pp. 179-186 (Year: 2011).*

Nunez, F et al., "ViSSh: A Data Visualisation Spreadsheet," in Proc. Joint Eurographics & IEEE TCVG, Symp. on Visualisation, Amsterdam, The Netherlands, May 29-31, 2000, pp. 209-218. (Year: 2000).*

* cited by examiner

| | A | B | C | D | E |
|---|---|---|---|---|---|
| 1 | Price | xxxxx | | | |
| 2 | Unit Cost | xxxxx | | | |
| 3 | Region | Quantity | Revenue | Total Cost | Profit |
| 4 | Northeast | xxxxx | xxxxx | xxxxx | xxxxx |
| 5 | Central | xxxxx | xxxxx | xxxxx | xxxxx |
| 6 | Midwest | xxxxx | xxxxx | xxxxx | xxxxx |
| 7 | West Coast | xxxxx | xxxxx | xxxxx | xxxxx |
| 8 | Sun Belt | xxxxx | xxxxx | xxxxx | xxxxx |
| 9 | | | | | |
| 10 | | | | Total Profit | xxxxx |

FIG. 1

| | Region | Quantity | Price | Revenue | UnitPrice | TotalCost | Profit | TotalProfit |
|---|---|---|---|---|---|---|---|---|
| 1 | Northeast | xxxxx | xxxxx | xxxxx | xxxxx | xxxxx | xxxxx | xxxxx |
| 2 | Central | xxxxx | | xxxxx | | xxxxx | xxxxx | |
| 3 | Midwest | xxxxx | | xxxxx | | xxxxx | xxxxx | |
| 4 | West Coast | xxxxx | | xxxxx | | xxxxx | xxxxx | |
| 5 | Sun Belt | xxxxx | | xxxxx | | xxxxx | xxxxx | |

FIG. 12A

|   | Region | Quantity | Revenue | TotalCost | Profit |
|---|---|---|---|---|---|
| 1 | Northeast | xxxxx | xxxxx | xxxxx | xxxxx |
| 2 | Central | xxxxx | xxxxx | xxxxx | xxxxx |
| 3 | Midwest | xxxxx | xxxxx | xxxxx | xxxxx |
| 4 | West Coast | xxxxx | xxxxx | xxxxx | xxxxx |
| 5 | Sun Belt | xxxxx | xxxxx | xxxxx | xxxxx |

|   | Variable Name | Value |   |   |   |
|---|---|---|---|---|---|
| 1 | Price | xxxxx |   |   |   |
| 2 | UnitCost | xxxxx |   |   |   |
| 3 | TotalProfit | xxxxx |   |   |   |

FIG. 15

METHOD AND SYSTEM FOR CELLULAR COMPUTATION AND DISPLAY

CROSS-REFERENCE TO RELATED APPLICATION

This application claims priority to U.S. Provisional Application No. 63/128,201, entitled "Method and System for Cellular Computation and Display", filed 21 Dec. 2020, and U.S. Provisional Application No. 63/215,713, entitled "Method and System for Cellular Computation and Display", filed 28 Jun. 2021, the entire disclosures of all of which are hereby incorporated by reference.

TECHNICAL FIELD

This subject matter relates generally to apparatus, processes, and systems for information processing using computer systems and, more particularly, to implementing computations in cellular units.

BACKGROUND

Electronic spreadsheets organize information in a grid of columns and rows. The intersection of a column and a row is referred to as a cell. Each cell of an electronic spreadsheet stores a data element, such as text or numerical data, or a formula, which may use data elements from other cells to calculate a desired result. Each cell in a spreadsheet represents a value, which can have a predefined relationship to the other values. If one value is changed, other values may need to be re-computed accordingly.

In conventional spreadsheets, a user may represent a list of values by entering data in adjacent cells. To compute a list of values, a formula must be copied to a range of cells. The result is often a spreadsheet that is hard to validate, and hard to maintain; a mistake in any of the cells of the spreadsheet may be hard to detect or pinpoint. Prior art spreadsheets may provide capability to display the predefined relationships among the cells via visual links or arrows. However, such links tend to clutter the display area rather quickly, further obscuring other elements of the spreadsheet computation.

An electronic spreadsheet is an example of a dataflow system, wherein the sequence in which the cells are to execute, i.e., the order in which the formulas are to be evaluated, is not specified by the user. A cell is executed only after all cells or values on which it depends have been evaluated, i.e., when the inputs to the formula in the cell are available.

Other examples of dataflow systems include visual programming systems wherein computations are represented as directed graphs, with graph nodes representing cells or modules comprising functions or formulas, and links or connections between pairs of nodes representing dependency relationships between the nodes.

Modules may contain a number of input and output ports or pins, and may be assembled on a graphical user interface by connecting a port on one module to a port on another module. Such assemblies typically yield structures that resemble electronic circuits, with numerous connections crisscrossing the display area. To reduce clutter on the display, prior art systems may provide means to box or factor out portions of a computation into separate modules with predefined input and output ports. Such user-defined modules may then be used in a manner similar to built-in modules to construct computation graphs or networks.

BRIEF SUMMARY

In accordance with one embodiment, the present invention comprises methods and systems for implementing computations as collections of cellular units comprising program instructions, some program instructions referring to values computed by program instructions in other cells, and associating the cellular units in memory in accordance with dependencies among program instructions of the cellular units, the dependencies being inferred automatically from the program instructions.

In accordance with one embodiment, the present invention comprises methods and systems for displaying multiple cells on a graphical user interface, some cells of the multiple cells comprising program instructions, and some cells of the multiple cells representing values, and changing the program instructions in one cell to include a program instruction referring to a value in another cell, and in response to the changing, displaying a visual element associating the one cell and the another cell on the graphical user interface.

In accordance with one embodiment, the present invention comprises methods and systems for representing multiple cells in memory, some cells of the multiple cells comprising program instructions, and some cells of the multiple cells representing values, and changing the program instructions in one cell having multiple program instructions to include a program instruction referring to a value in another cell, and in response to the changing, representing in memory a dependency association between the one cell and the another cell.

In accordance with one embodiment, the present invention comprises methods and systems for representing multiple cells in memory, some cells of the multiple cells comprising program instructions, and some cells of the multiple cells representing values, and changing the program instructions in one cell to include a program instruction referring to a value from multiple values represented in another cell, and in response to the changing, representing in memory a means to ensure that the another cell is executed prior to executing the one cell.

In accordance with one embodiment, the present invention comprises methods and systems for representing multiple cells on a graphical user interface, a plurality of the cells of the multiple cells comprising multiple nodes representing multiple program instructions, and changing a program instruction in a first cell to refer to a value computed by a program instruction in a second cell, and in response to the changing, creating a digital association between a first node from the first cell and a second node from the second cell, and displaying a visual representation of the digital association on the graphical user interface associating visual representations of the first node and the second node.

According to various aspects, the present invention comprises methods and systems for a implementing a spreadsheet calculator comprising one or more of: (i) a cell representing multiple values, (ii) a cell representing multiple values with at least two values of the multiple values being associated with different user-defined names, (iii) a cell comprising multiple formulas, (iv) a cell representing a value that is a data structure representing multiple values, (v) a cell comprising a formula that evaluates to a data structure representing multiple values, (vi) associating cells on a graphical user interface according to the dependencies among the values and formulas in the cells.

According to various aspects, the present invention comprises methods and systems for transforming a spreadsheet calculator into a new data structure comprising one or more of: (i) a cell representing multiple values, (ii) a cell representing multiple values with at least two values of the multiple values being associated with different user-defined names, (iii) a cell comprising multiple formulas, (iv) a cell representing a value that is a data structure representing multiple values, (v) a cell comprising a formula that evaluates to a data structure representing multiple values, (vi) a cell in the new data structure representing data or formulas from multiple cells in the spreadsheet, (vii) a cell representing a value in the new data structure, the value being a data structure representing multiple values comprising data from multiple cells in the spreadsheet.

According to various aspects, the present invention comprises methods and systems for one or more of: converting a conventional spreadsheet calculation into a cellular computation, converting a cellular computation into a conventional spreadsheet calculation, displaying multiple array objects having different sizes on a single grid, splitting program instructions from a program code into multiple program codes while preserving dependencies among the program instructions, combining program instructions from multiple program codes into a single program code while preserving dependencies among the program instructions.

These and other aspects of the present invention will be apparent from a reading of the following detailed description and a review of the associated drawings.

BRIEF DESCRIPTION OF THE DRAWINGS

The accompanying drawings, which are incorporated into this specification, illustrate one or more example embodiments of the inventions disclosed herein, together with the detailed description. The drawings are illustrative only, and that what is depicted therein may be adapted, based on this disclosure, in view of the common knowledge within this field.

In the drawings:

FIG. 1 is an exemplary spreadsheet.

FIG. 11A illustrates a diagram wherein four cells are selected. FIG. 11B illustrates a scenario wherein the selected cells have been joined or combined. FIG. 11C illustrates a scenario wherein a cell is split into two cells.

FIG. 12A-FIG. 12C illustrate grids or tables showing values of variables computed by a cellular program. FIG. 12A displays array and non-array values in one grid. FIG. 12B displays array values only. FIG. 12C displays non-array values only.

FIG. 15 represents an intermediate representation of a target spreadsheet during a transformation of a cellular computation into a conventional spreadsheet.

DETAILED DESCRIPTION

The following detailed description is illustrative only and is not intended to be in any way limiting. Other embodiments of the present inventions will readily suggest themselves to such skilled persons having the benefit of this disclosure, in light of what is known in the relevant arts.

In the interest of clarity, not all of the routine features of the embodiments described herein are shown and described. In the implementation of any such actual embodiments, numerous implementation-specific decisions must be made in order to achieve the specific goals of the developer, such as compliance with regulatory, safety, social, environmental, health, and business-related constraints, and that these specific goals will vary from one implementation to another and from one developer to another. Moreover, such a developmental effort might be complex and time-consuming, but would nevertheless be a routine undertaking of engineering for those of ordinary skill in the art having the benefit of this disclosure.

Throughout the present disclosure, relevant terms are to be understood consistently with their typical meanings established in the relevant art. However, without limiting the scope of the present disclosure, further clarifications and descriptions are provided for relevant terms and concepts as appropriate.

Figure 2:
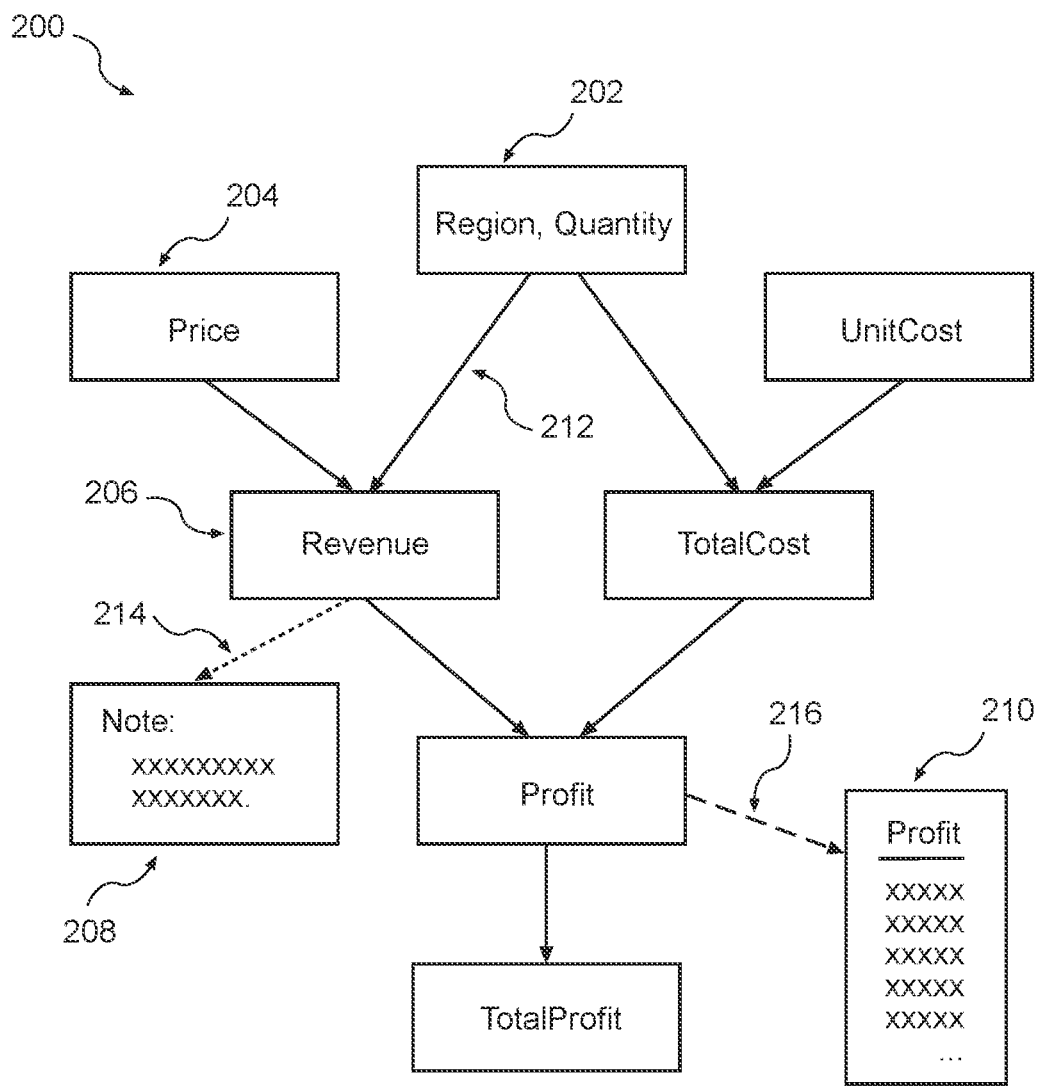
FIG. 2 shows the computation in the spreadsheet of FIG. 1 represented in an exemplary graphical format.
Figure 3:
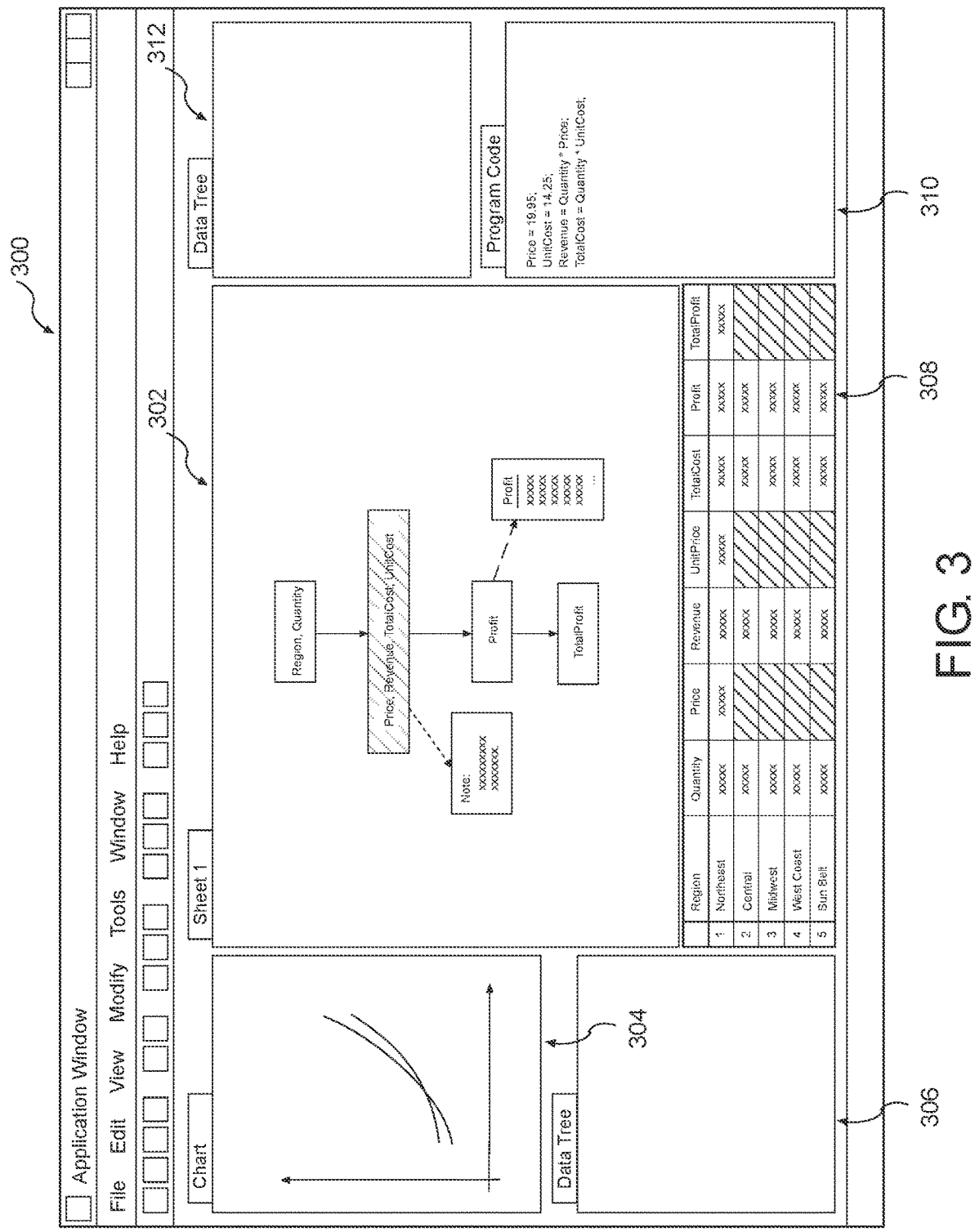
FIG. 3 shows an exemplary GUI window for editing and viewing cellular computations.

Cellular Computation—FIGS. 1-3

Embodiments of the present invention comprise methods and systems for creating, analyzing, and executing computer programs in various forms, including stand-alone programs, program fragments, spreadsheet calculations, and others.

In various embodiments, a plurality of cells are displayed on a graphical user interface, some cell comprising data elements such as text or numerical data, and some cells comprising program instructions to compute values or perform other desired action. Embodiments may display the cells in a grid, on a canvas, or using other means.

FIG. 1 is an exemplary spreadsheet 100 in accordance with one embodiment. The spreadsheet comprises data organized in rows and columns. Each cell in the spreadsheet may represent a value, such as a number 102 or a snippet of text 104, or a formula 106 for computing a value. A formula in a cell may refer to other cells. In the illustrative scenario of FIG. 1, values associated with the labels "Price" and "Unit Cost", as well as values associated with the labels "Region" and "Quantity" are raw data, while values associated with the labels "Revenue", "Total Cost", "Profit" and "Total Profit" are computed by evaluating formulas in the corresponding cells. In the illustrative scenario of FIG. 1, the formulas refer to values from other cells.

In the exemplary embodiment of FIG. 1, it is not clear whether a value displayed on the graphical user interface is raw data 102 104, or is the result of evaluation of a formula 106. Moreover, if the value is the result of evaluation of a formula, it is not clear whether the formula refers to, or depends on, values from other cells. More broadly, the structure of the computation represented in the spreadsheet is not readily ascertainable. To validate the spreadsheet, one has to examine each cell and trace its dependencies across the spreadsheet.

FIG. 2 is an alternative representation of the computation in the spreadsheet of FIG. 1, in accordance with one embodiment of the present invention. In the exemplary embodiment of FIG. 2, the program or computation is represented visually as a collection of cells, nodes, or modules 202 204 206 on a user interface canvas widget 200. Each cell may represent raw data such as numeric values or text, or program code to compute values or perform other action such as reading from a database or writing to a file. The program code in a cell may refer to values in a plurality of other cells. For example, in the illustrative scenario of FIG. 2, the cell labeled "Revenue" 206 contains program code "Revenue=Quantity*Price" (not shown), meaning that it depends on values for Quantity and Price from other cells 202 204. In the exemplary embodiment of FIG. 2, dependencies among the program code in various cells are expressed visually via connections or links 212 among the various cells.

The program code in a cell comprises a plurality of program instructions or statements. A program instruction may include an expression or formula that computes a value, and/or a command to perform a task, such as writing to a file. In the illustrative scenario of FIG. 2, the program code in the cell labeled "Revenue" 206 consists of a single program instruction "Revenue=Quantity*Price", which comprises the expression or formula "Quantity*Price" and an assignment operation to associate the result of evaluating the formula with a variable associated with the textual identifier, or name, "Revenue". This enables the value to be accessed from other formulas in other program instructions by referring to the variable via its name.

In the exemplary embodiment of FIG. 2, each cell that comprises a program code or otherwise produces a value, displays the names of the variables whose values it computes or evaluates. For example, the cell labeled "Revenue" 206 computes a value for a variable named "Revenue", and the cell labeled "Region, Quantity" 202 produces a value for a variable named "Region", and a value for a variable named "Quantity". A variable may represent a single value such as a number, text, date, etc., or an aggregate value or a data structure, such as an array, table, tree, etc. In the illustrative scenario of FIG. 2, the variable "Price" 204 represents a single numerical value, whereas the variable "Revenue" 206 represents an array of numbers. In one embodiment, the cell labeled "Region, Quantity" 202 represents a first variable named "Region" and representing an array of textual values, and a second variable named "Quantity" and representing an array of numbers. In another embodiment, the cell labeled "Region, Quantity" 202 represents a table comprising a first column named "Region" and a second column named "Quantity".

In the exemplary embodiment of FIG. 2, not all cells contain program code or data, or otherwise participate in the overall computation. In the illustrative scenario of FIG. 2, the display area contains a note cell 208 having textual information and linked 214 to a computation cell 206, indicating that the information in the note cell relates to the content of the computation cell. In the exemplary embodiment of FIG. 2, the connection 214 between a note cell and a computation cell is drawn differently to visually distinguish it from dependency connections linking computation cells 212.

In various embodiments, a cell may represent an object such as a text block 208, image, diagram, file, grid, date, annotation, url link, or other types of information. The user may view and edit the content represented by a cell by issuing the appropriate command such as a double click from the user interface.

In various embodiments, the contents of a cell, e.g., the program code or formula in a cell 202 204 206, may be viewed or edited by selecting the cell on the canvas 200 (e.g., via a click of a mouse or other pointing device). Responsive to the selecting, the content of the selected cell may be displayed in an editable area within the bounds of the cell on the canvas, or in a separate area of the user interface, where it can be edited.

Embodiments may provide various means to view variable values and other computation results, such as error codes that may arise during the execution of program code in various cells. In the illustrative scenario of FIG. 2, a display cell 210 displays the value computed by a computation cell. The display cell and the computation cell are associated 216 on the display, and the connection is drawn differently to visually distinguish it from other types of connections.

FIG. 3 illustrates an exemplary GUI window 300 for editing and viewing cellular computations in accordance with one embodiment of the present invention. The window 300 contains a canvas 302 for displaying cells and dependencies among them, a text editor area 310 for editing program code in a cell, a grid 308 for displaying variable values, a chart 304 for displaying variable values in graphical form, and other panels 306 312. The operation of the various areas on the exemplary GUI of FIG. 3 is described in detail below.

In the exemplary embodiment of FIGS. 2, 3, computation cells are labeled by the variables that they compute, and are connected according to the dependencies among the cells. This organization may make it easier to discern the overall structure of the computation and the dependencies involved. The separation of program code 302, 310 from the display of values that are computed by the program code 304, 308 may enable the display of program code and computation results to be configured separately, thereby enabling a more clear representation of the various aspects of the overall computation.

Figure 4:
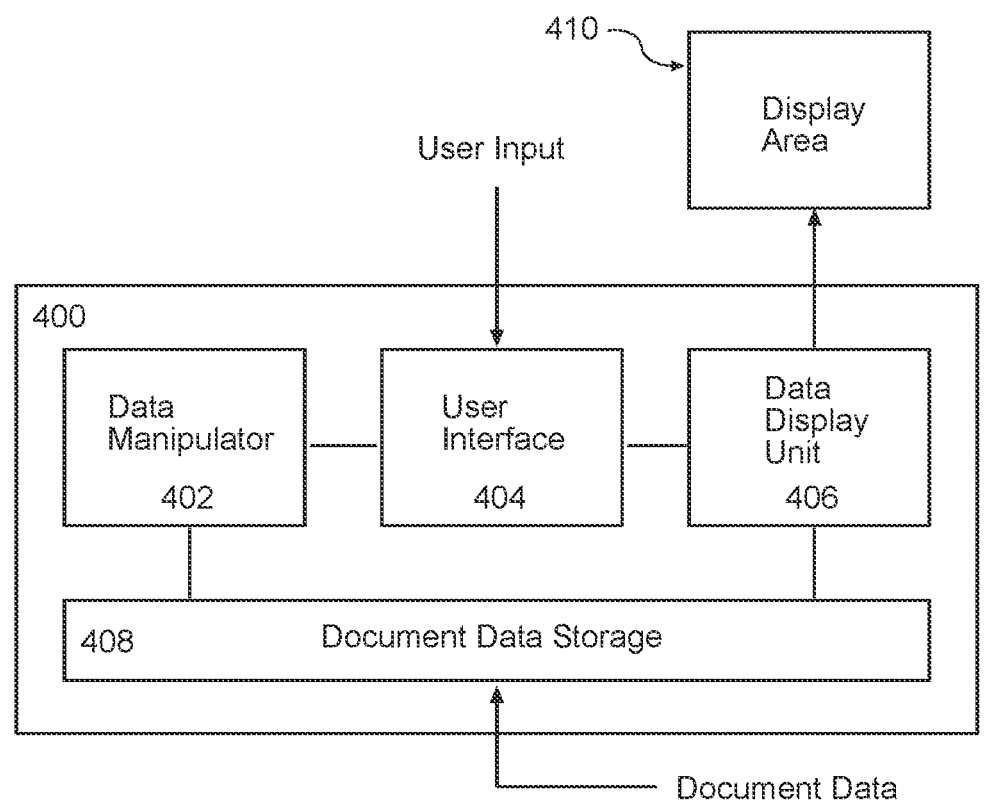
FIG. 4 is a block diagram of a data processing system, which can process a document such as the cellular computation shown in FIG. 2.

Data Processing System—FIG. 4

FIG. 4 is a functional block diagram of a data processing system 400 which can process a document such as the cellular computation 200 shown in FIG. 2. In the illustrated embodiment of FIG. 4, the data processing system 400 includes a data manipulator 402, a user interface 404, and a data display unit 406.

The user interface 404 receives input from a user and sends the input either to the data display unit 406 to be processed and displayed and/or to the data manipulator 402 to manipulate the data. The user input can be a command, content (e.g., text), or other related input. The data manipulator 402 receives document data (e.g., data from document 200), which may include text content, document structure data, and other related data such as metadata, from a document data storage 408, and manipulates the received document data according to the user input. The manipulated document data is then stored in the document data storage 408. The data display unit 406 receives the user input from the user interface 404 and the document data from the storage 408, and processes the user input and the document data to generate a visual representation of the document data. The data display unit 406 displays various components of the processed user input and the document data on a display area 410 in a manner that will be described in more detail below.

Figure 5:
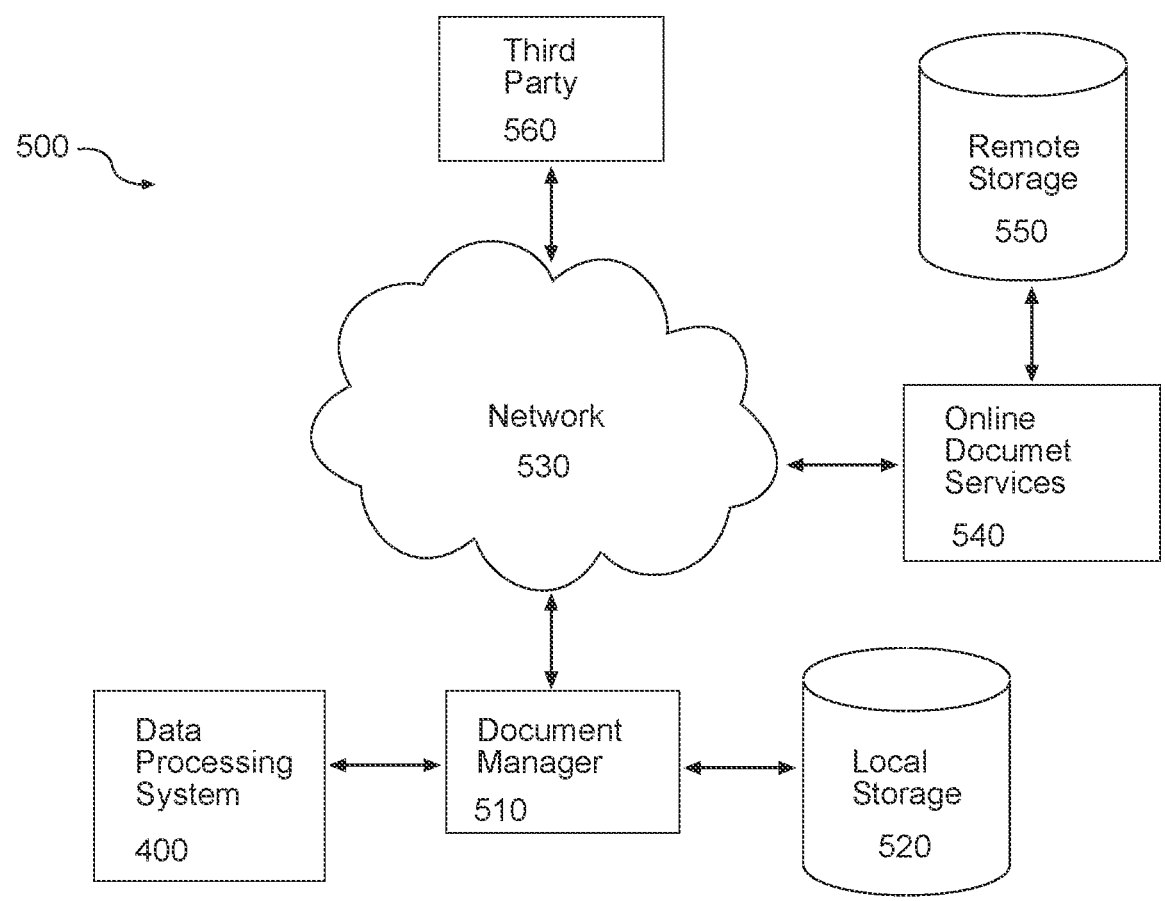
FIG. 5 illustrates a document management system in accordance with one embodiment.

Document Management System—FIG. 5

FIG. 5 is functional block diagram of a document management system that may be used to manage a collection of documents such as a document containing the exemplary computation 200 shown in FIG. 2. In the illustrated embodiment of FIG. 5, the data processing system 400 described in connection with FIG. 4 interacts with a document manager 510 to fetch and load documents and related data.

In various embodiments, a document may contain references to objects that exist independently of it, such as records in a common system calendar, annotation definitions referenced by a plurality of documents or objects, program libraries referenced by program code in a plurality of documents, and links to other documents or to resources such as image, video and text files. The document manager 510 resolves these references as needed to locate the required data.

For example, in one embodiment, a document being displayed on the display area 410 may contain a link to another document. The user may issue a command to the user interface 404 to fetch and open the document referred to by that link. In response, the data processing unit 400 forwards the request to the document manager 510 depicted in FIG. 5, which in turn tries to locate the requested resource. If the requested document is not available in the local storage 520, the document manager 510 sends a request to the external server 540 for the requested document. Once the requested document is located in the local storage 520, or received from the external server 540, the document manager 510 passes the document to the data processing system 400, which in turn displays the document in the display area 410.

Although one local data store 520 and one remote data store 550 are shown in FIG. 5, it is to be understood that documents and other content and related data may be stored in a plurality of data stores and locations, including locally, remotely, or a combination thereof.

In various embodiments, the location from which to find and retrieve desired content may be specified by the user, or resolved automatically by the document manager 510. Whether stored locally or in a remote repository, the document and any referenced content may be stored as one or more files, or as one or more records in a database, or a combination of the two.

In various embodiments, the document manager 510 may be a standalone configuration without a connection to a network 530, or a thin client delegating most operations to a remote server 540, or something in between.

In one embodiment, the remote storage 550 is managed by an online document service 540 running on a server computer having a server application for communicating with the document manager 510. The document manager 510 may include a client application operable to communicate with the online document service 540 via a network 530, such as the Internet.

The online document service 540 may include a plurality of services, such as user accounts, access control, online document editors, collaboration and management tools, and others. Additional client and/or server applications 560 may be in communication with the online document service 540 and/or the document manager 510 via the network 530.

Operation

FIGS. 1-3, 8-15 illustrate graphical user interfaces (GUIs) for use in manipulating cellular computations in accordance with one or more embodiments. The GUIs may be employed in a cellular computation editing system, such as that shown in FIG. 4. In general, a user can create, edit, store and otherwise manipulate parts of a document, computation, or spreadsheet through the GUIs.

The operation of the data processing unit 400, and in particular, the operation of the data display unit 406 and its associated units with respect to the display area 410, is described below in detail in connection with FIGS. 1-3, 8-15. Though the operation is described with reference to what is displayed to a user, it is to be understood that the display is generated by the units of the data processing 400 and document management 500 systems responding to user input and document data.

Though the operations are described with reference to specific user actions and editing outcomes, it is to be understood, however, that the operations are not limited to the specific details provided, and numerous other variations may be provided by embodiments.

Figure 6:
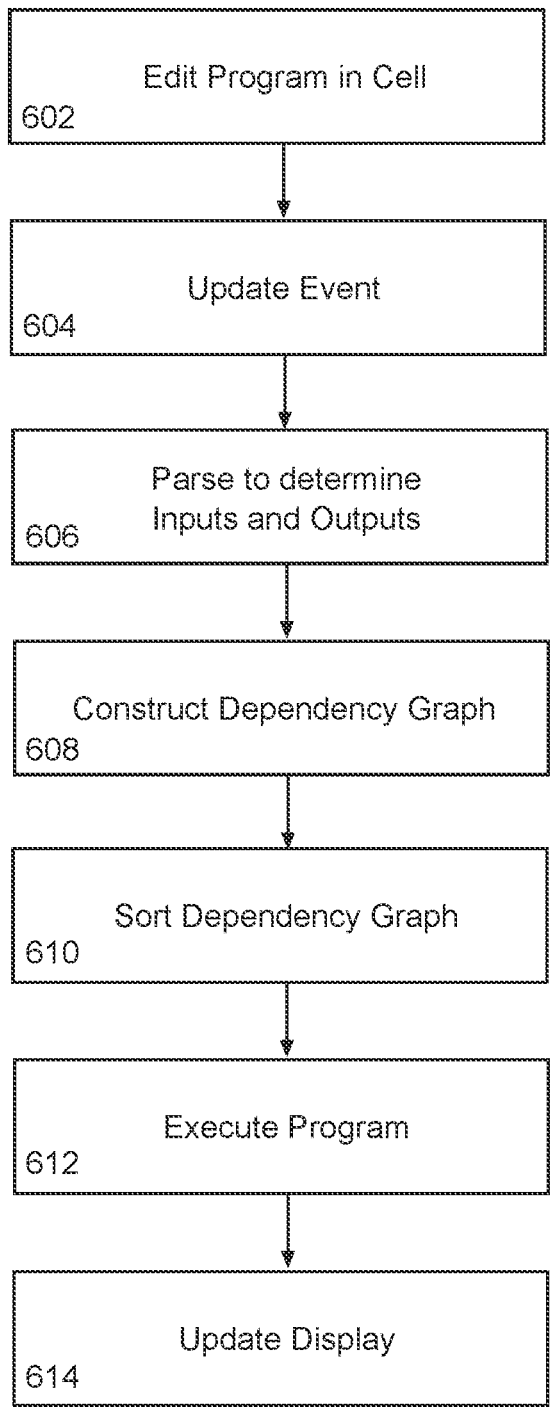
FIG. 6 is a block diagram of an edit-analyze-run cycle of a cellular program in accordance with one embodiment.
Figure 7:
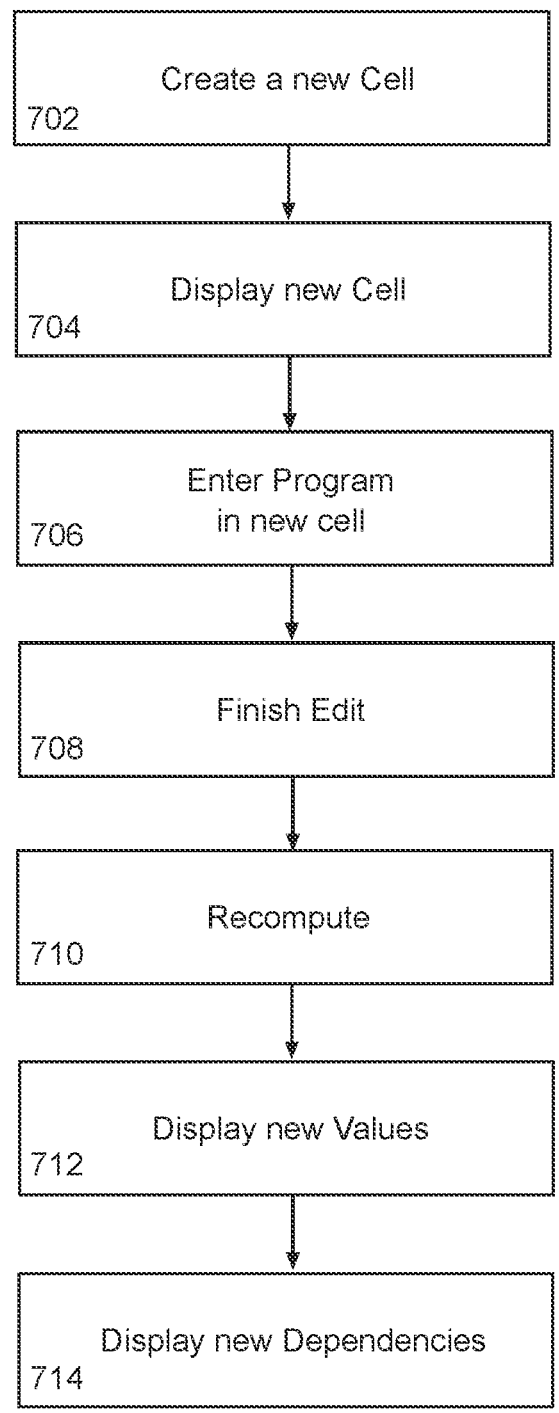
FIG. 7 is a block diagram of a user-interaction scenario to create and program a cell.

Dependency Graph—FIGS. 6, 7

In the exemplary embodiment of FIG. 2, the relationship among the various cells (i.e., dependence of program code in one cell on the values computed in other cells) defines a dependency graph wherein the nodes of the graph represent the cells and the connections or links or edges of the graph represent the dependencies among the cells. The dependency graph is an example of a directed graph wherein connections between cells are directed from one cell to another according to the dependency between the cells.

In various embodiments, the order of execution of cells (i.e., the order in which program code in one cell is to be executed in relation to program code in other cells) is determined automatically by analyzing the dependencies among the cells. A cell may be executed only when all its inputs are available, i.e., only after all cells on which it depends have been executed. This may be accomplished in various ways.

In one embodiment, the directed graph representing the cells and their dependencies is topologically sorted, and the cells are executed in turn according to their position in the sorted list. In another embodiment, the directed graph is not sorted. Rather, when a cell finishes execution, its outputs are added to a list of available values, and the dependency graph is consulted to find a next cell that is available for execution, i.e., all of the next cell's inputs have been computed, or are otherwise available.

It is to be understood that a dependency graph is a conceptual construct. Embodiments may represent dependency relationships and dependency graphs in various ways. In one embodiment, a dependency graph is represented in memory as a collection of digital associations between pairs of cells. In another embodiment, a dependency graph is represented in memory as a collection of cells, each cell being associated with the names of the outputs from other cells on which it depends, rather than the actual other cells representing the outputs. Similarly, in one embodiment, a digital representation of a dependency association between two cells may comprise a digital association between the two cells, and in another embodiment, a digital representation of a dependency association between two cells may comprise a digital association between one cell and the outputs of the other cell on which the one cell depends. Many other approaches are possible and readily suggest themselves to such skilled persons having the benefit of this disclosure, in light of what is known in the relevant arts.

In various embodiments, the edit-analyze-run cycle is automatic, meaning that once the content of a cell is modified (e.g., via a user-initiated edit), the modified cell is recomputed automatically, and all cells that depend on values computed in the modified cell are recomputed as well.

FIG. 6 is a block diagram of an edit-analyze-run cycle in accordance with one embodiment. In the first block 602, a user edits program code in a cell, for example via a text editor area 310 described in connection with FIG. 3. The editing process is finished when the user issues the appropriate command, e.g., by pressing a combination of one or more keys on the keyboard or other input device, by pressing a button on a graphical user interface, or by selecting another cell on the canvas.

In the second block 604, the change in the cell is detected, and an update process is triggered. In various embodiments, the update process is triggered automatically upon detection of a change in program code in one or more cells. In one embodiment, the update process is not triggered automatically, and must be initiated explicitly by a user, e.g., by pressing a user interface button, or one or more keys on a keyboard. In various embodiments, the update process may be configured by a user to proceed automatically, or upon user command.

In the third block 606, in response to the update event 604, the program code in the cell is parsed to determine input and output variables. For each cell, input variables are defined as the variables on which the program code in the cell depends; and output variables are defined as the variables whose values are computed by the program code in the cell. The input and output variables of all the cells in a computation define the dependency graph for the computation. In one embodiment, only the modified cell is parsed or otherwise analyzed to determine its input and output variables. Other embodiments may parse or analyze every cell each time one or more cells are updated.

In the fourth block 608, the input and output variables for the cells are used to construct a dependency graph for the overall computation. In the fifth block 610, the dependency graph is topologically sorted.

In the sixth block 612, the cells are computed (i.e., their program code is executed) in turn according to their topologically sorted order. Embodiments may rely on various strategies to reduce the amount of computation that is required. For example, in one embodiment, only cells that depend on the changed cell are recomputed, while in another embodiment, all cells are recomputed in response to a change in any cell.

In the seventh block 614, the user interface is updated to reflect the results. In the exemplary embodiment of FIG. 2, the connections among the cells are updated to reflect the dependencies among the cells, as computed in the fourth block 608 of FIG. 6. In the exemplary embodiment of FIG. 3, the variables that are being displayed, including their names and values 302 304 308, are updated to reflect values computed in the sixth block 612 of FIG. 6. In case of an error, e.g., syntax or semantic errors in program code, runtime errors, etc., the display is updated accordingly.

FIG. 7 is a block diagram of a user interaction scenario in accordance with one embodiment. In the first block 702, a user creates a cell, via a user-interface command. In response, the newly created cell is displayed on a graphical user interface 704. In the third block 706, the user proceeds to enter a program snippet (e.g., a formula) in the newly created cell, via an editor area. In the fourth block 708, the user issues a command to indicate that the edit process is finished. In the fifth block 710, the system detects the change in the cell, and re-computes the updated cell and all cells depending on it. The process encapsulated in the fifth block 710 proceeds in a manner similar to the process described in connection with the second block 604 through the sixth block 612 of FIG. 6.

Returning to FIG. 7, in the sixth block 712, the display is updated to show newly computed values. In the seventh block 714, the user interface is updated to display the connections among the cells according to their dependencies. In various embodiments, the dependencies among the various cells are determined automatically by analyzing the program code in each cell, and connections are automatically displayed on the graphical user interface to visually express the dependencies.

The discussion in connection with FIGS. 6, 7 includes references to FIGS. 2, 3. It is to be understood that such references are illustrative only and are not to be construed as limiting in any way. It is to be understood that the processes described herein are not limited to the specific details provided, and numerous other variations may be provided by embodiments. In particular, in the illustrative embodiment of FIG. 6 a dependency graph is constructed 608 and topologically sorted 610 in order to determine execution order of the cells 612. Other embodiments may not sort the dependency graph, and may instead rely on other means to ensure that the cells are executed in proper order, i.e., only when all their inputs are available, as described above.

Data Structures

In a conventional spreadsheet, a list of values may be represented by data entered in adjacent cells, typically in the same column. To compute a list of values, a formula must be copied to a range of cells. To update or change how the list of values is computed, a new formula must be copied to every cell in the range of cells. A mistake e.g., an erroneous edit, in data or formula in an individual cell at any time during the lifespan of the spreadsheet may be hard to detect or pinpoint. Consequently, to validate a spreadsheet calculation, it may be necessary to inspect every non-empty cell in the spreadsheet.

Data structures such as arrays enable data to be represented as aggregate values that can be managed more easily. However, working with arrays in many programming languages often requires index calculations that may be tedious and error prone.

Various embodiments of the present invention may provide means to express computations using program instructions capable of processing entire arrays or other aggregates as single units of computation. For example, in the exemplary embodiment of FIG. 2, subtracting a list of costs from a list of revenues to compute a list of profits is accomplished with a single statement "Profit=Revenue−TotalCost", wherein "Revenue" and "TotalCost" are names of variables, each variable representing a list or array of numerical values.

Arrays may be fixed-sized, meaning that new elements cannot be added to the array, or variable-sized, meaning that new elements can be added to the array. An embodiment may provide fixed-sized arrays only, variable-sized arrays only, or both. Arrays are sometimes referred to as lists.

Embodiments of the present invention may include functionality for processing data structures of various kinds, such as arrays, tables, trees, strings, etc. as single units. For example, embodiments may provide array arithmetic operations (e.g., addition, subtraction, multiplication, and division), array logic operations (e.g., logical AND, OR, and XOR), as well as other relevant programming language constructs such as iterators, loops, and conditionals.

For example, in various embodiments, an array arithmetic operator may take one or more values as input and return a value as output, wherein the input and output values may be numbers, arrays, or a combination of both. In one illustrative scenario, the operation 2+3 returns the value 5; the operation 2+A, wherein A is an array of numbers, returns a new array having the same length as A, with each element in the new array being computed by adding the value 2 to the corresponding element in the array A; and the operation A+B, wherein A and B are arrays of numbers, returns a result array whose elements are the sum of the corresponding elements of the arrays A and B.

Embodiments may provide other programming constructs to facilitate operations on arrays and other data structures. In one embodiment of the present invention, program instructions may include tandem loops capable of iterating through multiple arrays together, or in tandem. For example, in one exemplary embodiment, the illustrative statement "for (x: X, y: Y→Z) {save x+y}" iterates through arrays "X" and "Y" in tandem, and in each step of the iteration associates the parameters "x" and "y" with values at the corresponding index in their respective arrays "X" and "Y". Upon execution, the loop creates a new array "Z" with the same size as "X" and "Y", and at each step of the iteration, assigns the value "x+y" to the corresponding index in the array "Z".

The ability to process an entire array or other collection of data as a single unit may help to simplify a broad range of computations typically performed in conventional spreadsheet calculators. The simplification may be in the form of a reduction in the amount of program code required to express a computation, a reduction in the number of formulas in a spreadsheet, easier verification and validation of the resulting program or computation, and easier maintenance of the resulting program, calculation, or spreadsheet.

Variables

The program code in a cell may refer to values computed in other cells. In various embodiments, values are associated with, or represented by, variables having textual identifiers or names that may be specified by a user. Program code in a cell may access a value associated with a variable by specifying the variable's name.

For example, in the case of a spreadsheet calculator, the cells correspond to variables, and addresses of the cells in the rows and columns of the spreadsheet (e.g., "B1") correspond to the textual identifiers of the variables.

In one exemplary embodiment of the present invention, the program instruction "Revenue=Quantity*Price" declares a new variable named "Revenue" and assigns a value to it (i.e., associates a value with it). The expression or formula on the right hand side of the assignment operator refers to, or accesses, the variables "Quantity" and "Price", which may have been defined in the same cell, or in one or more other cells.

In one embodiment of the present invention, program instructions are specified through specialized user interface widgets, and referring to a variable is accomplished by selecting the variable's name from a list of available variables in a GUI selector widget. Many other approaches are possible and readily suggest themselves to such skilled persons having the benefit of this disclosure, in light of what is known in the relevant arts.

Figure 8:
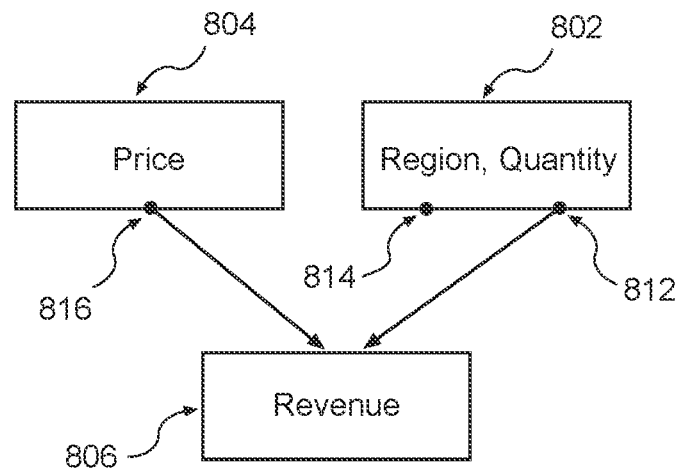
FIG. 8 is an illustrative use of ports to enable access to a variable in one cell from another cell.

Visibility and Scope Rules—FIG. 8

In one embodiment, a variable declared or initialized in a first cell may be modified only within the first cell; for all other cells, the variable is treated as a constant. In another embodiment, a variable declared or initialized in one cell may be modified in one or more other cells.

Embodiments may control or restrict access to, or visibility of, variables in various ways. The rules that govern access to variables declared or initialized in one area by program code in other areas are referred to as scope rules. Variables may be local to a cell, meaning that they are accessible only within the program code of the cell. Other variables may be non-local, meaning that they are accessible to program code in other cells as well.

In various embodiments, any non-local variable in one cell is accessible to program code in other cells by default, without any additional action taken by the user. Other embodiments may restrict access to variables by default, and require explicit user action to enable access to variables from other cells.

FIG. 8 is an illustrative scenario in accordance with one embodiment of the present invention. Two cells 802 804 are adorned with ports or pins 812 814 816, each port being associated with a variable that may be accessed from program code in other cells. In the exemplary scenario of FIG. 8, a user has connected the ports associated with the variables "Price" 816 and "Quantity" 812 to the cell labeled "Revenue" 806, making the variables "Price" and "Quantity" accessible to the program code in the cell labeled "Revenue". The port associated with the variable "Region" 814 is not connected to the cell labeled "Revenue" 806, meaning that the value for the variable "Region" is not accessible in the program code of the cell labeled "Revenue".

In the exemplary embodiment of FIG. 8, access to non-local variables is established by manually connecting to the relevant ports. Once the cell 806 is connected to the relevant ports 812 814 816, the program code in the cell 806 can refer to the relevant non-local variables by their names, e.g., "Revenue=Price*Quantity".

Other approaches are possible. In one embodiment, access to non-local variables may be established via directives analogous to "include" or "import" mechanisms of conventional programming languages such as C. Upon detection of such a directive, the embodiment may visually connect the relevant ports on the graphical user interface automatically to provide feedback to the user. Many other approaches are possible and readily suggest themselves to such skilled persons having the benefit of this disclosure, in light of what is known in the relevant arts.

Figure 9:
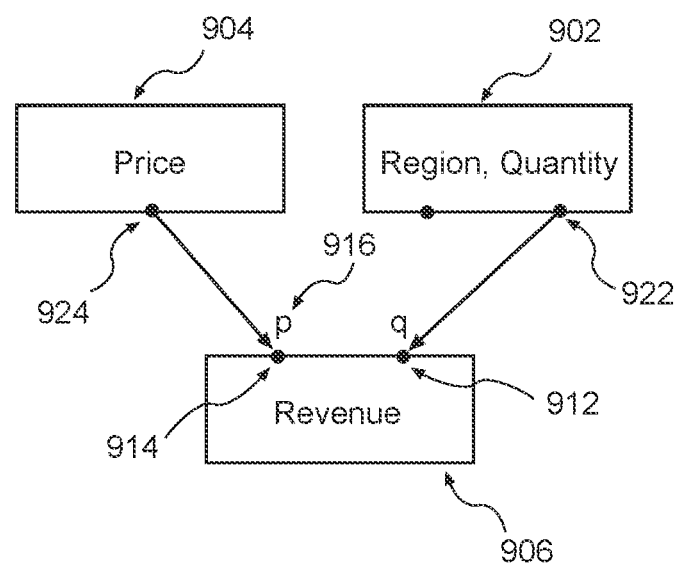
FIG. 9 is an illustrative use of ports to represent formal parameters.

Variables vs. Formal Parameters—FIG. 9

In various embodiments of the present invention, program code in a cell may access the value of a variable declared or computed in another cell by specifying the variable's name. For example, in one embodiment, the program instruction "Revenue=Quantity*Price" refers to, or accesses, the variables named "Quantity" and "Price", which may be declared or computed in one or more other cells. This form of access to variables is analogous to accessing local variables in conventional programming languages.

An alternative form of access, also common in conventional programming languages, is access via formal parameters of a function, wherein the program code in the body of a function refers to the formal parameters of the function, rather than directly accessing variables declared in other parts of the program. When a function is called or invoked, values of local variables are copied into, or associated with, the formal parameters of the function as inputs to the function, making the values available to the program code in the body of the function.

In an analogous way, embodiments of the present invention may enable access to non-local variables through a formal parameter mechanism, rather than via directly referring to the non-local variables by their name.

FIG. 9 represents an illustrative scenario in accordance with one embodiment of the present invention. In the exemplary embodiment of FIG. 9, inputs 912 914 to a cell 906 represent formal parameters. Each cell 906 explicitly declares its inputs as formal parameters, each formal parameter having a name 916 that is accessible only within the program code of the cell 906. The formal parameters are represented on the display by visual elements representing contact pins or ports 912 914 for the cell 906, each port being associated with the name 916 of its corresponding formal parameter. The formal parameters of a cell 906 may be accessed, or referred to, only within the program code of the cell 906.

In the exemplary embodiment of FIG. 9, two cells 902 904 are adorned with visual elements representing output pins or ports 922 924, each output port being associated with a variable whose name appears above the port.

The program code of a cell 906 refers to its formal parameters 916, rather than variables declared in other cells. To specify initial values for the formal parameters, each formal parameter or input must be explicitly associated with a value computed by another cell. This may be accomplished by explicitly connecting visual elements representing inputs and outputs of the relevant cells on the display, e.g., by dragging the mouse from the output port of one cell to an input port of another cell.

In the exemplary scenario of FIG. 9, prior to executing the program code in the cell labeled "Revenue" 906, the value of the output variable "Price" is associated with the formal parameter "p" 916, and the value of the output variable "Quantity" is associated with the formal parameter "q". The program code in the cell labeled "Revenue" then computes the value of "Revenue" via the program instruction "Revenue=p*q".

Duplicate Names—FIG. 10

In various embodiments, it is an error to declare multiple variables having the same name, even if the variables are declared in different cells. In other embodiments, it is legal to declare multiple variables having the same name, as long as the variables are declared in different cells. In such cases, disambiguation means may be employed to distinguish among variables with the same name.

Figure 10A:
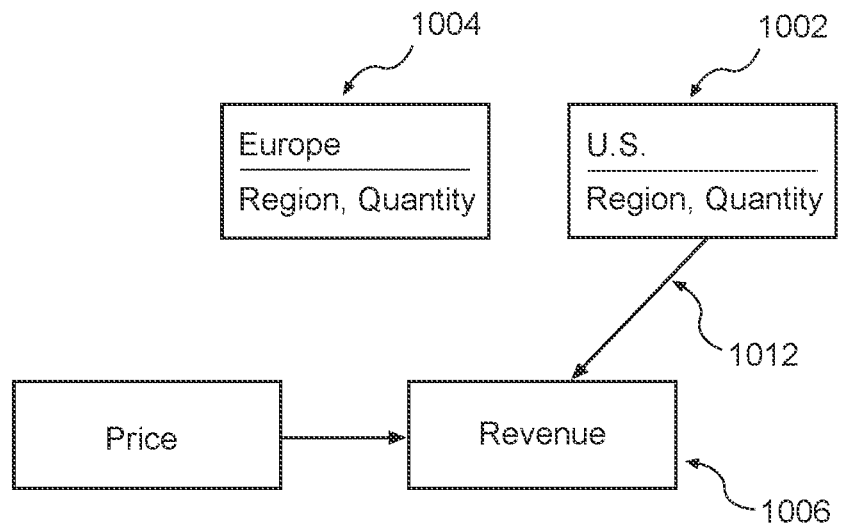
FIG. 10A and FIG. 10B illustrate a means whereby duplicate names may be disambiguated by explicitly connecting relevant cells or ports on cells.

FIG. 10A is an illustrative scenario in accordance with one embodiment of the present invention. In the exemplary embodiment of FIG. 10A, two cells 1002 1004 declare variables with the same names, i.e., "Region" and "Quantity". Another cell 1006 includes the program instruction "Revenue=Price*Quantity". From the program instruction alone, it is unclear which variable named "Quantity" is intended. To disambiguate the reference to "Quantity", the user may explicitly connect or otherwise associate 1012 the cell with the desired variable "Quantity" 1002 to the cell computing the value for "Revenue" 1006 via appropriate user interface means such as a drag operation.

Figure 10B:
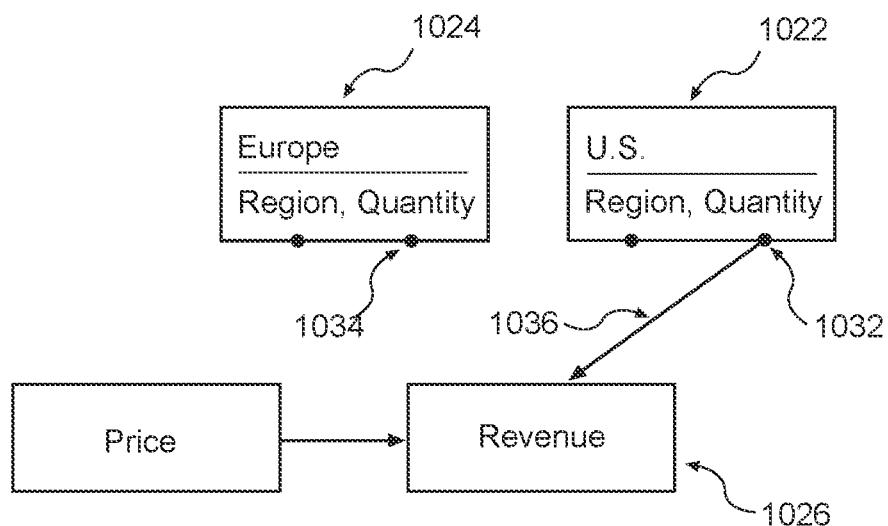

FIG. 10B is a representation of the scenario of FIG. 10A in accordance with another exemplary embodiment of the present invention. In the illustrative embodiment of FIG. 10B, two cells 1022 1024 are adorned with output ports 1032 1034, each port associated with a variable declared in its respective cell. To distinguish between the two variables named "Quantity", the user may explicitly connect 1036 the port associated with the desired variable 1032 to the cell computing "Revenue" 1026.

Other disambiguation methods are possible. In one embodiment, access to variables having the same name may be clarified by qualifying the name of each variable with a cell identifier to indicate where the variable is declared (e.g., "SalesUS.Quantity"). Alternatively, variable names from one cell may be "included" or "imported" into another cell via a command or directive, thereby alleviating the need to qualify variable names from the imported cell (e.g., "import SalesUS.Quantity"). Many other approaches are possible and readily suggest themselves to such skilled persons having the benefit of this disclosure, in light of what is known in the relevant arts.

Splitting and Joining Cells—FIG. 11

In various embodiments of the present invention, cells may be combined, split, or otherwise edited. In one embodiment, a user may activate an editor for a cell by double clicking on it. In response, the cell is placed in edit mode and a boundary or other visual feedback is displayed to alert the user to that fact. In another embodiment, responsive to selecting a cell on a canvas or a grid, a separate edit area on the graphical user interface is updated to display the content of the cell.

Figure 11A:
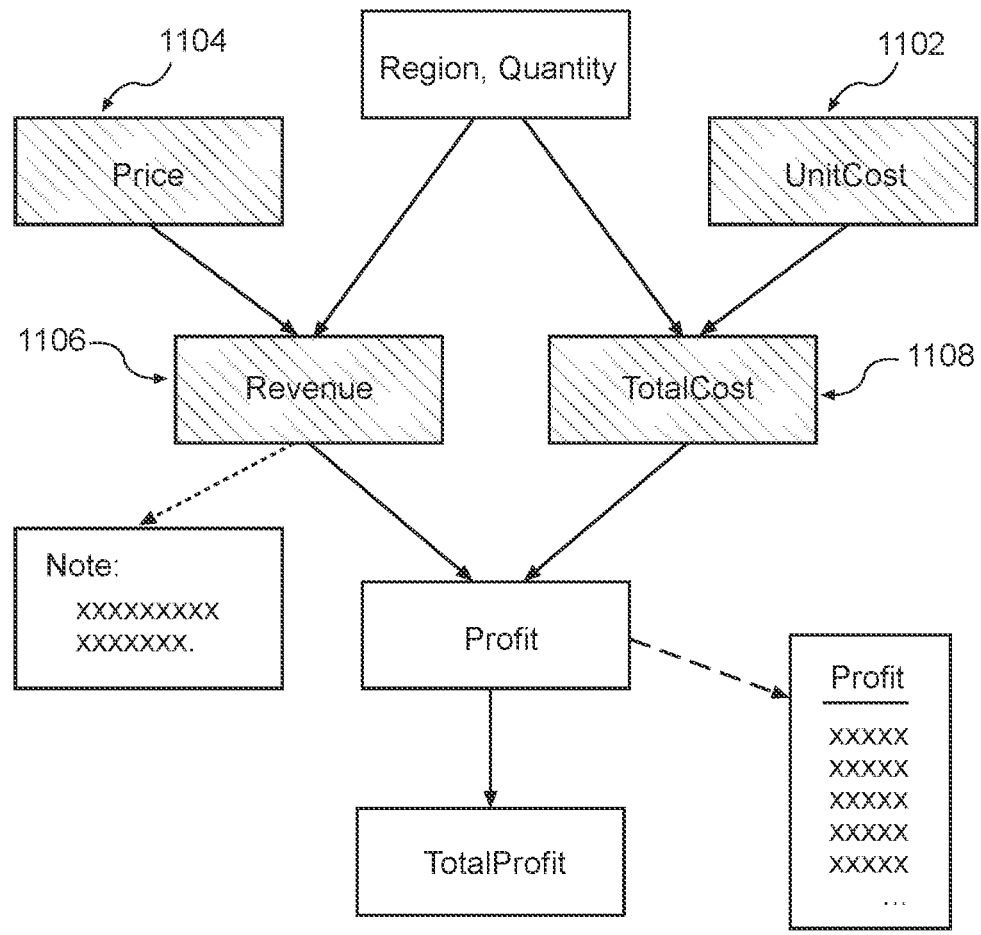
FIG. 11A-FIG. 11C illustrate scenarios wherein multiple cells are joined and split.

FIG. 11A is an illustrative scenario in accordance with one embodiment of the present invention. Four cells 1102 1104 1106 1108 have been selected. A user then issues a command, e.g., by selecting a menu button, to combine the selected cells. Responsive to the command, the program code from the selected cells are combined to form a new program code for a new cell 1122 (FIG. 11B), and the selected cells 1102 1104 1106 1108 are replaced by the new cell 1122. The program codes of the selected cells 1102 1104 1106 1108 are combined automatically, and in accordance with the dependencies among the selected cells, in order to preserve proper execution order of the program codes. For example, in the illustrative scenario of FIG. 11B, the program code for the new cell 1122 may be as follows:

Price=19.95;
UnitCost=14.25;
Revenue=Quantity*Price;
TotalCost=Quantity*UnitCost;

In particular, the program code for the new cell 1122 includes a program instruction for evaluating the variable "Revenue", i.e., "Revenue=Quantity*Price", which appears after the program instruction initializing the variable "Price", e.g., "Price=19.95".

Figure 11B:
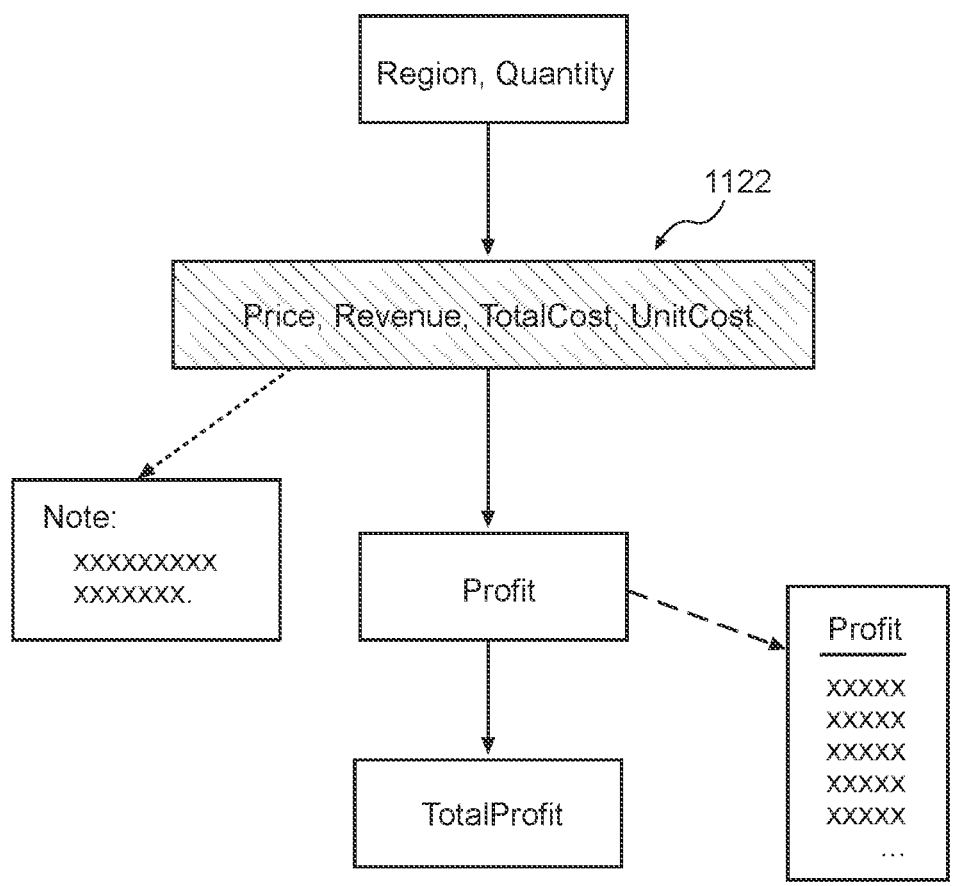

In various embodiments, a user may move or copy program codes from multiple cells simultaneously to a single text editor area. In the exemplary scenario of FIG. 11A, the user may copy the selected cells 1102 1104 1106 1108 to a text editor area 310 (FIG. 3) via a copy and paste or a drag and drop operation. In response, the program code of the selected cells are combined automatically, in accordance with the dependencies among the cells, and added to the text editor area 310. In response, the display is updated 302 to reflect the new configuration of the cells (FIG. 11B).

Figure 11C:
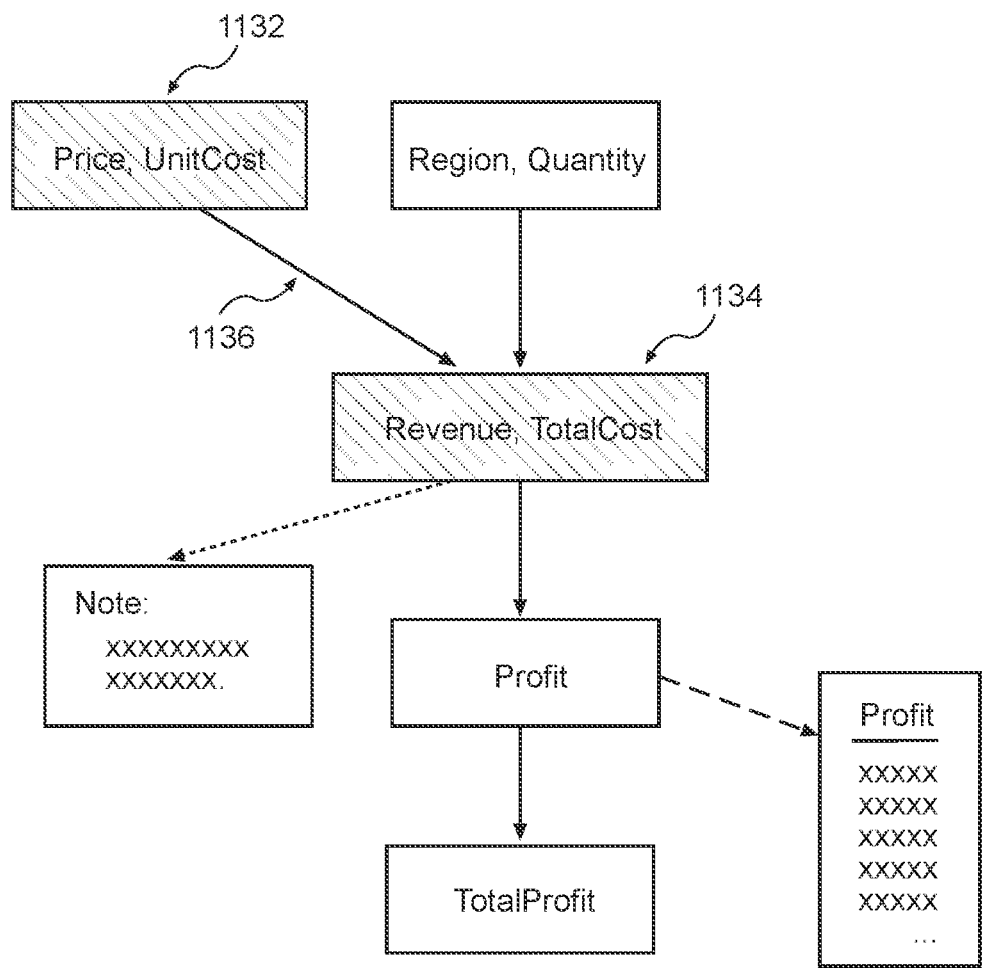

In various embodiments of the present invention, the program code in a cell may be split among two or more cells. In one embodiment, a portion of the program code in the cell may be selected in a text editor. The selected portion of the program code may then be moved to a new cell via cut and paste or drag and drop operations. For example, in the illustrative scenario of FIG. 11B, a user may select the first two lines of the program code in the new cell 1122, i.e., program instructions for initializing "Price" and "UnitCost", in a text editor area 310 (FIG. 3). The user may then drag the selected text out of the text editor area 310 on the graphical user interface, and drop it on the canvas area 302. FIG. 11C illustrates the result in accordance with one embodiment. Responsive to the drop operation, a new cell 1132 is created with program code to initialize the variables "Price" and "UnitCost". The program code in the original cell 1122 (FIG. 11B) is updated 1134 (FIG. 11C) to no longer include the program instructions to initialize the variables "Price" and "UnitCost". A new connection 1136 is automatically displayed to visually express the dependency between the two cells 1132 1134.

Displaying Values—FIG. 12

Figures 12B, 12C:
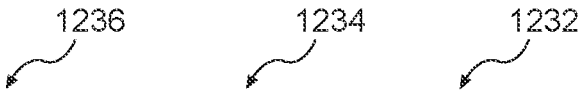

In various embodiments of the present invention, values of variables may be displayed in a dedicated area of the user interface 308 (FIG. 3). FIGS. 12A-C represent illustrative scenarios in connection with the illustrative computation of FIG. 2, in accordance with one embodiment of the present invention. In the exemplary embodiment of FIGS. 12A-C, variable values are displayed in grids or tables in a dedicated area of the graphical user interface.

In the exemplary embodiment of FIG. 12A, variable names are displayed as column headers in a grid, and variable values are displayed in columnar format underneath the variable names. Array values are displayed as columns underneath their corresponding variable names 1202. Simple, or non-array, values are displayed on the first row underneath their corresponding variable names 1204, and the remaining cells in the column are shaded 1206. In the exemplary embodiment of FIG. 12A, areas of the grid are shaded to express that a variable is associated with a value that is either not an array, or is an array whose length is different from that of one or more other arrays being displayed.

In various embodiments, value displays may be filtered to show a subset of the available variables. In the exemplary embodiment of FIG. 12B, only variables representing array values are displayed. Variables associated with non-array values have been filtered out. In the exemplary embodiment of FIG. 12C, only variables representing non-array values are displayed.

In various embodiments, value displays may be formatted to display values in various formats. In the exemplary embodiment of FIG. 12C, one variable is displayed per row, with the variable names being displayed in one column 1236, and variable values being displayed in another column 1234. Additional columns 1232 are available to display other attributes or properties associated with a variable or value.

Multi-Dimensional Arrays

In various embodiments of the present invention, a computation may yield one or more multidimensional arrays as values. In one embodiment, a 2-dimensional array value may be displayed in a grid in row-major order, i.e., by mapping the first dimension of the array to the columns of the grid, and mapping the second dimension of the array to the rows of the grid. Higher-dimensional arrays may be sliced into 2-dimensional pages, and the pages displayed on a 2-dimensional grid one page at a time. In one embodiment, higher-dimensional arrays may be treated as 2-dimensional arrays for the purposes of displaying the arrays in 2-dimensional grids. In particular, the first dimension of an n-dimensional array may be mapped to the columns of the grid, and the remaining n−1 dimensions may be mapped to the rows of the grid. This is analogous to slicing the n-dimensional array into 2-dimensional pages, and displaying all of the pages together as one long page, on a single grid.

Alternatively, in one embodiment, multi-dimensional arrays may be mapped to rows and columns of a grid in column-major order. Many other approaches are possible and readily suggest themselves to such skilled persons having the benefit of this disclosure, in light of what is known in the relevant arts.

Charting Values

In various embodiments of the present invention, an array representing numerical values may be displayed in a chart as a series of numerical values. In one embodiment, a 2-dimensional array may be split into 1-dimensional arrays, which are then displayed on a chart, each 1-dimensional array being displayed as a series of numerical values. In one exemplary scenario, a 2-dimensional array may be displayed in a grid, and subsequent to receiving an appropriate user command the array may be split along each row. Each resulting 1-dimensional array (i.e., each row array) may then be displayed in a chart as a series of numerical values, each series corresponding to a row of numerical values in the grid.

Alternatively, in one embodiment, a 2-dimensional array may be displayed in a grid, and subsequent to receiving an appropriate user command the array may be split along the columns. Many other approaches are possible and readily suggest themselves to such skilled persons having the benefit of this disclosure, in light of what is known in the relevant arts.

Zooming

In various embodiments of the present invention, the overall computation as represented in the cells on a canvas 302 (FIG. 3) may be augmented, or otherwise overridden, by user interaction with other elements of the graphical user interface 300. For example, user interaction with values being displayed in a grid 308 or a chart 304, or user interaction with other user interface widgets such as knobs, sliders, etc. may result in the main computation 302 being overridden or overruled in parts, without actually changing the program code 310 of the cells.

In one illustrative scenario in accordance with an exemplary embodiment of the present invention, the program code in a first cell computes a numerical array representing values from 1 through 10, and associates the array with an output variable named "x". A second cell comprises program instruction "y=f(x)", wherein "f" is the name of a function that takes an array of numerical values as input and returns a numerical array, which is to be associated with a variable named "y". A chart is configured to display the values of the variables "x" and "y", wherein the array associated with the variable "x" is mapped to the x-axis, and the array associated with the variable "y" is displayed as a series of numerical values plotted against the x-axis. Interacting with the chart, the user issues a command to zoom in to a smaller region of the x-axis, for example, to the region where x is between 4.9 and 5.1. In response, the first and second cells are recomputed, this time with the variable "x" representing an array value having the same number of elements as before, but starting at 4.9 and ending at 5.1. The display is updated to show the result of the zoom operation.

In this exemplary scenario, the program code of the first cell is not changed in response to the user command. Rather, the program code of the first cell is overruled in favor of the zoom parameters specified through user interaction with the chart. In one embodiment, prior to executing a program instruction that computes a value for the variable "x", an environment or context object is queried to determine if the value for the variable "x" should be overridden. If so, the program instruction is ignored, and instead, the variable "x" is associated with the override value specified by the user command and obtainable from the environment or context object. Program execution then proceeds to the second cell, which uses the value associated with the variable "x" to compute a new value for the variable "y".

In one embodiment, the program code in the first cell must explicitly query an environment or context object for the existence of an override value. In another embodiment, the context query is automatic. Many other approaches are possible and readily suggest themselves to such skilled persons having the benefit of this disclosure, in light of what is known in the relevant arts.

Hybrid Computation

In various embodiments of the present invention, different cells may represent different types of computational elements, such as textual program code, forms with text fields and other user interface widgets to facilitate user input, grids to facilitate user input of data into arrays and tables, embedded spreadsheets, embedded directed graph computations similar to the exemplary embodiment described in connection with FIG. 2, etc.

In one exemplary embodiment, the program code in a first cell may be in a proprietary language, the program code in a second cell may be in a conventional programming language, the program code in a third cell may be in the form of a list or table of textual and numerical data directly entered into a grid, and the program code in a fourth cell may be a cellular computation similar to the computation described in connection with FIG. 2.

In one exemplary embodiment, a first cell and a second cell may each comprise a spreadsheet, the formulas in the first and second cell may refer to cells in the spreadsheets, and in response to changes to the formulas, the display may be updated to include one or more connections between the first cell and the second cell, and among the cells of the spreadsheets, to express the dependencies among the formulas of the spreadsheets.

In various embodiments, the computation in each cell proceeds according to the type of the cell. For example, referring back to FIG. 6, the determination of inputs and outputs in the third block 606 proceeds according to the type of information in each cell. If a cell comprises program code in a first textual language, the program code is parsed by a compiler or interpreter for the first textual language to determine inputs and outputs of the cell. If the program code is in the form of a user interface widget with fields for user input, the inputs and outputs are obtained from the widget as appropriate. In the sixth block 612, the program code in each cell is executed according to the type of the program code in each cell. If the program code is in the form of a textual language with a compiler or interpreter, the compiler or interpreter is initialized with the values of the inputs to the cell, the program code in the cell is executed, and the results of the computation of the program code are associated with output variables of the cell. If the program code is in another format, e.g., a widget of some kind, then the program code is initialized with inputs, a specially designated function or method of the widget or program code is invoked to run or execute the program code, and the results are associated with output variables, as appropriate.

Explicit Computation Order

In some cases, it may be desirable for a user to be able to specify explicitly if a cell is to be computed before another cell, rather than relying exclusively on dependencies among the cells to determine execution order. Such cases may arise in a variety of situations, including: if a variable defined in one cell can be modified in other cells; if computation in a cell can have side effects (e.g., saving or deleting files); or if the dependency graph has cycles.

In one embodiment, sequential ordering of cells may be altered, or otherwise specified via one or more special connections or links made explicitly by a user. Such connections may serve as additional constraints placed on the dependency graph to influence the order of execution of the cells in the dependency graph.

In one embodiment, the overall computation may proceed sequentially by default, for example, by the embodiment executing the cells in the order they were created, or by requiring the cells to be displayed in a list rather than on a canvas. In this way, the overall computation order does not rely on dependencies among the cells. The individual cells in the embodiment, however, may include program code comprising cellular computations similar to the computation described in relation to FIG. 2, and may rely on dependency graphs to ensure proper execution order within the program code of each of the individual cells.

Various embodiments of the present invention may provide special connections and cells to construct more complex programming constructs. In one embodiment, a loop may be constructed by connecting a header cell representing the loop header and a body cell representing the loop body. The header cell and the body cell may be connected via a special connection to link their operations.

Grid vs. Canvas

The cells described in connection to FIGS. 2-3, 8-11 and elsewhere herein may be displayed as cells on a canvas, or cells on a grid. The grid or canvas may be flat or hierarchical. In one embodiment of the present invention, a conventional spreadsheet calculator is augmented to include one or more of the elements described herein. Such elements include, but are not limited to, displaying dependencies among the cells on the graphical user interface; enabling formulas to process data structures such as arrays as a single unit; enabling cells to include a plurality of formulas, or more complex program code; enabling cells to represent more than a single value at a time. Many other combinations of elements are possible and readily suggest themselves to such skilled persons having the benefit of this disclosure, in light of what is known in the relevant arts.

Figure 13:
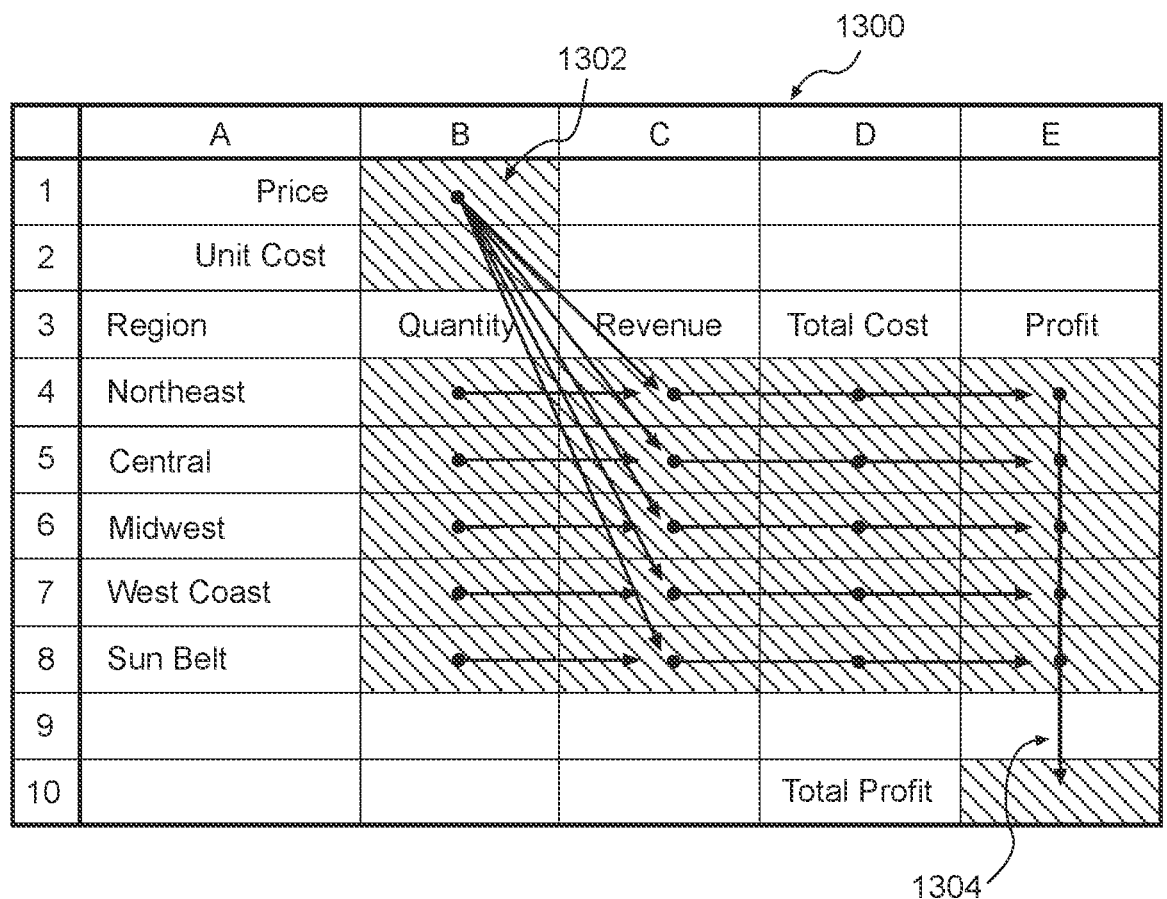
FIG. 13 represents a spreadsheet with dependencies among cells explicitly displayed.

Spreadsheet Analysis—FIG. 13

Embodiments of the present invention may include functionality to extract and diagram the computations and dependencies in conventional spreadsheets. Such functionality may be used for purposes of validation and verification of the computation represented in a spreadsheet, or to make dependencies among the spreadsheet cells more visually transparent.

FIG. 13 is a representation of the spreadsheet of FIG. 1 in accordance with one exemplary embodiment of the present invention. In the illustrative scenario of FIG. 13, data from a conventional spreadsheet file is read into memory and displayed in a conventional spreadsheet grid structure 1300 on the display. Cells containing numerical values 1302 and formulas are shaded for easy identification, and their values are suppressed to reduce clutter on the display. Dependencies among the various cells are identified by inspection of their formulas, and displayed on the graphical user interface as graphical arrows 1304. To reduce clutter on the screen, some dependencies may be suppressed. In the illustrative scenario of FIG. 13, all dependencies relating to the evaluation of cells under the label "Total Cost" have been suppressed. As a result, there are no arrows that terminate on any of the cells under the label "Total Cost". However, dependencies of other cells on the cells under the label "Total Cost" are still being displayed.

Analyzing large spreadsheets may benefit from zoom features, wherein the cells are displayed as small rectangles, and dependencies among the cells are displayed at a reduced density (e.g., for alternating cells only). Visualization techniques similar to those employed for visualizing vector fields or fluid flows may be used to visualize the dependency arrows flowing through the various areas of the spreadsheet.

Figure 14:
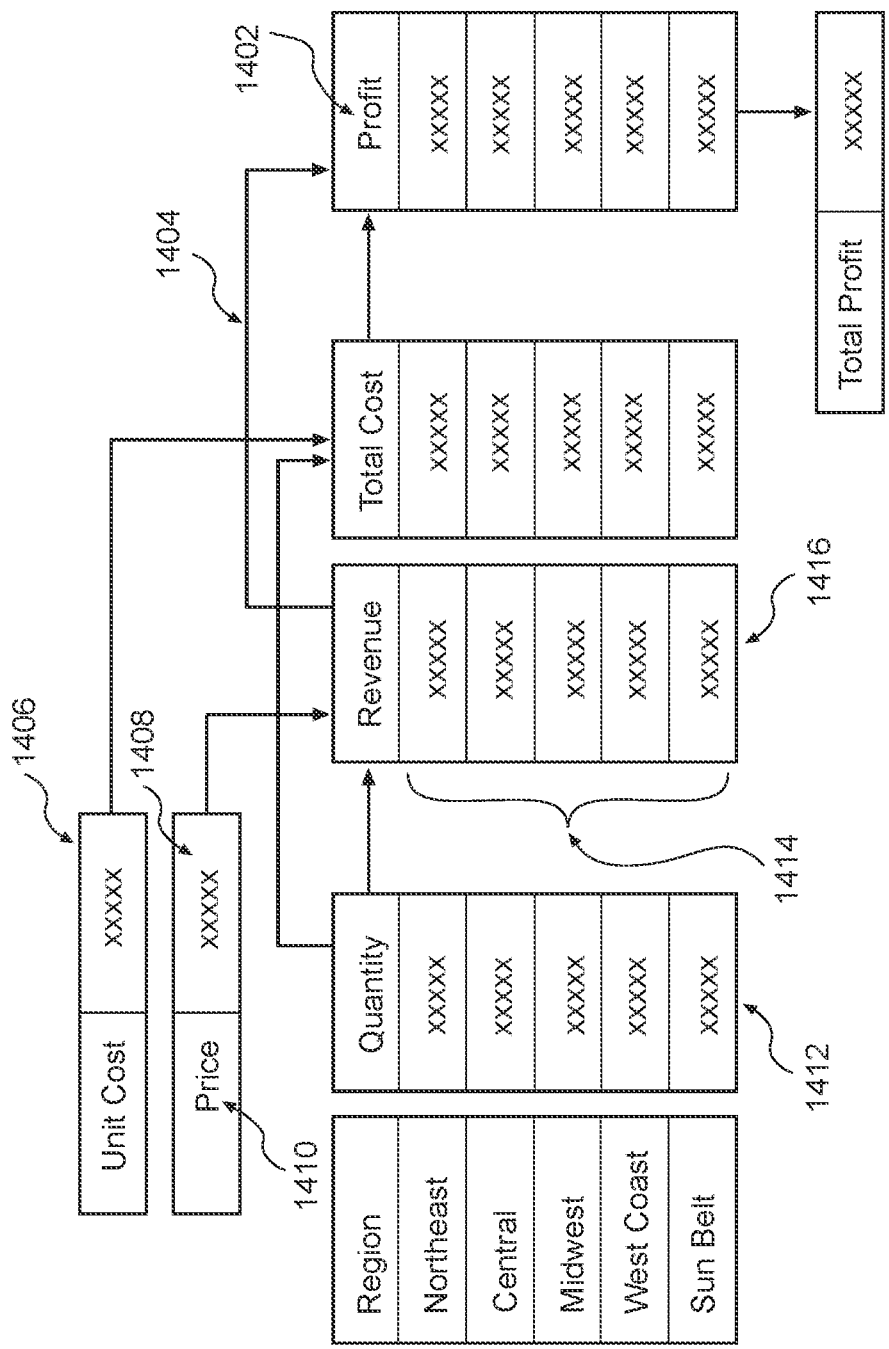
FIG. 14 represents an intermediate representation of the spreadsheet of FIG. 1 during a transformation of the spreadsheet into a cellular computation.
Figure 15:
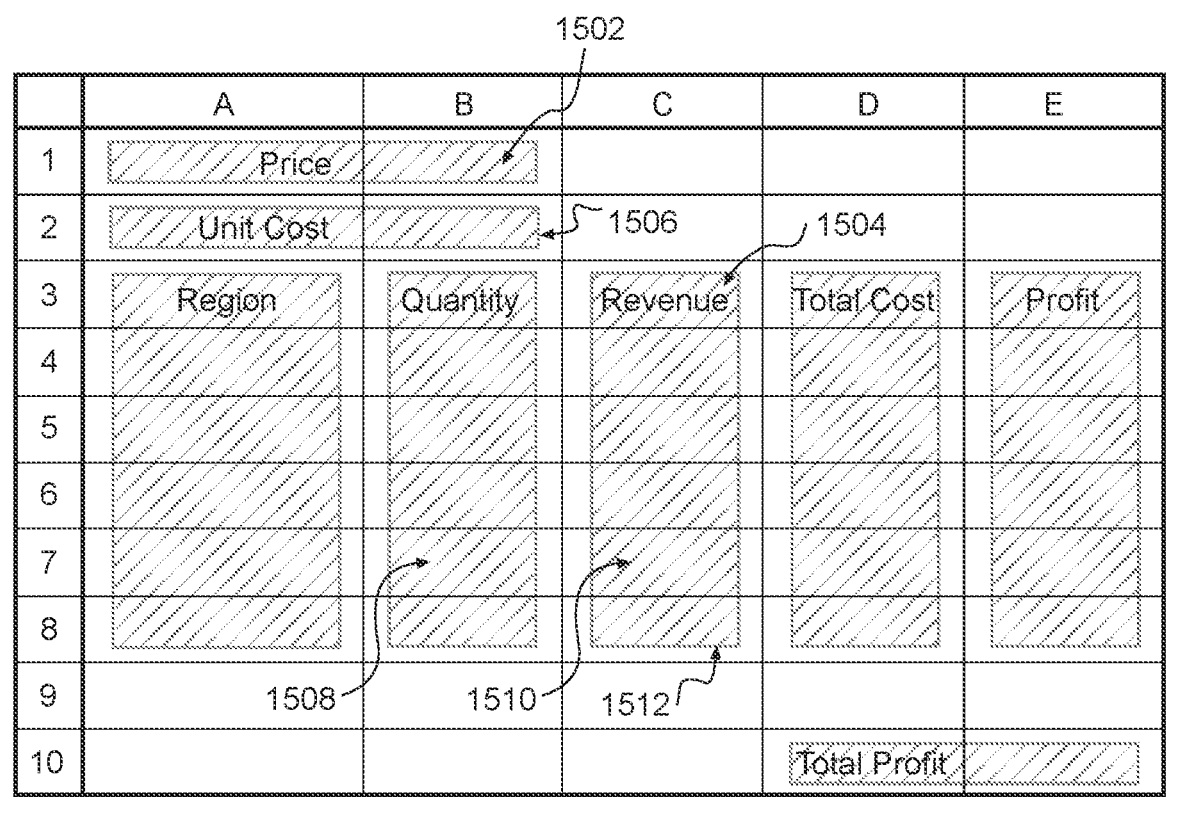

Spreadsheet Conversion—FIGS. 14, 15

Various embodiments of the present invention may provide means to convert spreadsheet data into a cellular computation similar to the computation described in connection with FIG. 2. Conventional spreadsheet data and formulas may be extracted and converted into computations expressed using data structures such as arrays, and aggregate operations such as array arithmetic operations.

In one embodiment, data from a conventional spreadsheet such as the exemplary spreadsheet of FIG. 1 is read into memory and displayed in a familiar spreadsheet grid. The spreadsheet is then analyzed and conceptually related cell are grouped together to form an intermediate representation of the spreadsheet computation. The intermediate representation is then used to generate a target cellular computation such as the exemplary computation of FIG. 2.

FIG. 14 is an intermediate representation of the spreadsheet of FIG. 1 in accordance with one embodiment of the present invention. In the exemplary embodiment of FIG. 14, groups of related cells have been identified 1406 1412 1416. Each group includes a cell containing a textual label 1402 1410, and some groups include a plurality of cells containing similar formulas 1414. Arrows between the groups 1404 summarize the dependencies among the formulas of the cells of the groups. Each group of cells represents a single variable in the target cellular computation, some groups representing variables having array values 1412 1416, and other groups representing variables having non-array values 1406. The label cell in each group represents a candidate name for the variable in the target computation 1402 1410. The similar formulas in the cells of each multi-cell group 1414 are to be replaced with a single formula in the target computation, the single formula computing the entire array in a single operation.

To generate the intermediate representation of FIG. 14, the data from the spreadsheet of FIG. 1 is analyzed to discover groups of adjacent cells with similar formulas, which may be combined into arrays. Candidate groups are identified based on the similarity of the formulas in the relevant cells, the proximity of the cells to each other, their orientation on the spreadsheet grid and their position with respect to nearby label cells, and other factors. This analysis may proceed automatically, manually by a user, or via a combination of the two. In one exemplary embodiment, candidate groups are identified automatically, and the user is provided with an opportunity to approve or override suggested groupings, and to change suggested variable names. The result of this analysis is an intermediate representation of the spreadsheet data, such as the exemplary representation of FIG. 14, wherein related cells are grouped together and links are displayed between related groups to visually express their dependencies.

To convert the intermediate representation of FIG. 14 into a cellular computation similar to that represented in FIG. 2, the groups in the intermediate representation are converted into program instructions, each program instruction corresponding to a cell in the target cellular computation. Each group in the intermediate representation comprises a label cell and a plurality of cells representing either simple data 1408 or a formula 1414. In one embodiment, the text in the label cell is used as a new variable name 1402 1410, and the plurality of simple data 1408 or formulas 1414 associated with the group provide the data or formula for computing a value that is associated with, or assigned to, the variable.

For example, in the exemplary embodiment of FIG. 14, the group comprising the cell labeled "Price" is replaced with the program instruction "Price=19.95", wherein 19.95 is the value (not shown) in the data cell 1408 associated with the cell labeled "Price" 1410. The group 1412 comprising the cell labeled "Quantity" is replaced with the program instruction "Quantity={xxxxx, xxxxx, xxxxx, xxxxx, xxxxx}", wherein the right hand side of the assignment operator is an array expression returning an array object representing the values in the data cells associated with the cell labeled "Quantity". The group comprising the cell labeled "Revenue" 1416 is replaced with the program instruction "Revenue=Quantity*Price", wherein the formula "Quantity*Price" represents the similar formulas in the formula cells 1414 associated with the cell labeled "Revenue".

In one embodiment, a group of similar formulas is converted into a single array formula by first noting that the formulas are identical, except for the consecutive cells to which they refer. Since the groups are chosen so that related cells are grouped together, the references to the consecutive cells may be replaced by a reference to the group to which the consecutive cells belong. As a result, the multiple similar formulas in a group may be replaced by a single formula referring to variables representing entire arrays.

It is to be understood that the above procedure is illustrative only and should not be construed as limiting the scope of the present invention in any way. Many other approaches are possible and readily suggest themselves to such skilled persons having the benefit of this disclosure, in light of what is known in the relevant arts. For example, in one embodiment, to convert a group of spreadsheet formulas into a single formula that computes an array value, the conversion may proceed as follows: (1) Identify candidate cells 1414 for conversion to array representation; (2) Replace formulas in the candidate cells and formulas referring to the candidate cells with formulas expressed in terms of array indices, rather than row/column addresses of cells; (3) When every formula in a group of similar formulas 1414 refers to array indices rather than row/column addresses of cells, replace the group of formulas with a single formula expressed as array operations operating on entire arrays, wherein the single formula does not include references to array indices.

Embodiments of the present invention may comprise means to convert cellular computations such as the exemplary computation represented in FIG. 2, into a conventional spreadsheet format such as the exemplary spreadsheet of FIG. 1. In one embodiment, cellular computation data such as the exemplary computation of FIG. 2 is read into memory. The computation is then analyzed and variables and their associated values are identified. This information is then used to generate a target spreadsheet such as the exemplary spreadsheet of FIG. 1.

FIG. 15 is an intermediate representation of the target spreadsheet in accordance with one embodiment. Starting with an empty spreadsheet grid, groups of cells or regions 1506 1512 are identified, marked, or otherwise set aside, each region corresponding to a variable in the cellular computation of FIG. 2, and comprising a plurality of cells sufficient to represent the name of the variable, and the value or values associated with the variable. For example, if a variable "Revenue" 1504 is associated with an array of length 5, six cells are included in the region 1512 corresponding to the variable "Revenue" on the spreadsheet grid: five cells for formulas to compute the values in the array, and one cell for the label "Revenue". In one embodiment, the regions are displayed on the graphical user interface as shaded rectangles 1506 1512, and may be moved, reoriented horizontally or vertically, and otherwise manipulated by the user to achieve a desired layout on the spreadsheet grid.

Once the layout of the regions on the spreadsheet grid is established, the values and formulas of the cells are determined from the formulas in the cellular computation being converted. If a cell in the spreadsheet represents a label 1504, the name of the corresponding variable is copied to the cell. If a cell in the spreadsheet represents a simple value 1502, the value is copied to the cell. If a cell in the spreadsheet represents a formula 1510, the corresponding formula from the source cellular computation is converted into spreadsheet format.

To convert a formula, any references to variables in the formula are converted into references to spreadsheet cells. For example, for each cell 1510 in the region corresponding to the variable "Revenue" 1512, the formula "Price*Quantity" is converted by replacing the reference to "Price" by the address of the appropriate cell 1502 in the spreadsheet (e.g., "B1"), and by replacing the reference to "Quantity" by the address of the corresponding cell 1508 in the region representing the variable "Quantity".

It is to be understood that the above procedure is illustrative only and should not be construed as limiting the scope of the present invention in any way. Many other approaches are possible and readily suggest themselves to such skilled persons having the benefit of this disclosure, in light of what is known in the relevant arts.

Conclusion, Ramifications, and Scope

Accordingly the reader will see that the invention and embodiments disclosed herein may enable computations to be expressed in a form that may be easier to express and understand than computations expressed in conventional visual programming systems, and easier to validate and maintain than conventional spreadsheet calculations with large numbers of formulas. Various embodiments of the present invention may combine various elements presented in this disclosure in various forms. For example, an embodiment may display connections among cells to display their dependencies; provide a array operations to specify computations on entire arrays as single units; allow cells to comprise computations beyond simple formulas; allow cells to have multiple values; enable values to be accessible via user-defined variable names; allow program code in a cell to refer to variables defined in other cells; allow variables to be accessed directly via their names rather than through formal parameters; connect cells rather than individual input and output ports; display connections among cells automatically according to their dependencies rather than requiring the user to specify connections explicitly; provide hybrid computation models wherein the overall computation may be directed in part by consideration of dependencies among cells, and wherein the program code within cells may be specified in accordance with various technologies and paradigms; allow cells to display different kinds of information, such as the names of input and output variables, or actual values computed.

Although the description above contains many specificities, these should not be construed as limitations on the scope, but rather as illustrations of several embodiments thereof. Many other variations are possible. For example, the display area 410 (FIG. 4) may comprise a window in a graphical user interface (GUI) environment, a GUI pane, a physical surface such as a computer screen, a wall or a table, etc.; what is displayed may be in the form of spatial or holographic images, projections on a surface such as a wall or a table, or projections in a virtual- or augmented-reality device and/or headset, or directly on the retina, or via electromagnetic signals delivered to the brain or the nervous system through an interface, including an artificial interface. Touch, gestures, head/body orientation, eye tracking, sound, voice and other means, including electronic interface with the brain or nervous system, may be used to complement, or instead of, mouse or keyboard operations.

Though various aspects and operations are described with reference to specific user actions and editing outcomes, it is to be understood, however, that the various aspects and operations are not limited to the specific details provided, and numerous other variations may be provided by embodiments. Accordingly, the scope should be determined not by the embodiments illustrated, but by the appended abstract and the appended claims and their legal equivalents.

The steps of a method or algorithm or the functions of a module, unit or block described in connection with the embodiments disclosed herein can be embodied directly in hardware, in a software module executed by a processor, or in a combination of the two Furthermore, those of skill in the art will appreciate that the various illustrative logical blocks, modules, units, and method steps described in connection with the above described figures and the embodiments disclosed herein can often be implemented as electronic hardware, computer software, or combinations of both. To clearly illustrate this interchangeability of hardware and software, various illustrative components, blocks, modules, units, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, unit or step is for ease of description. Specific functions or steps can be moved from one module, block or unit to another without departing from the invention.

Various illustrative embodiments have been described. However, one of ordinary skill in the art will see that additional embodiments are also possible and within the scope of those embodiments. For example, while the embodiments described above refer to particular features, the scope of this invention also includes embodiments having different types of features, embodiments having different combinations of features and embodiments that do not include all of the described features. Accordingly, the present invention is not limited to only those embodiments described above.

Figure 16:
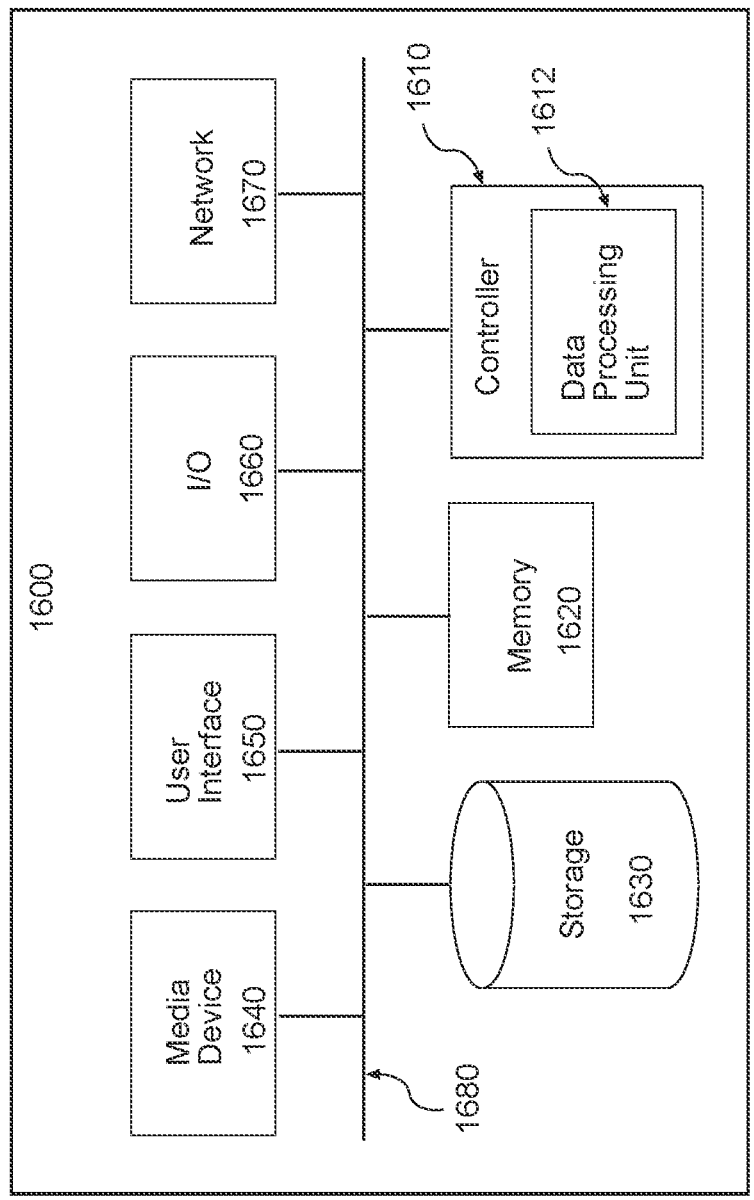
FIG. 16 shows a block diagram of one embodiment of a computer system upon which one or more aspects of the embodiments of the present invention may be implemented.

Computing System—FIG. 16

Various embodiments are realized in electronic hardware, computer software, or combinations of these technologies. The various components of the embodiments may be located at one or more devices. The various modules and components may be combined, rearranged, or their functionality broken out into other modules and components in numerous different ways as appropriate to a particular embodiment.

FIG. 16 shows a block diagram of one embodiment of a computer system 1600 upon which embodiments of the present invention may be implemented and carried out. The computer system 1600 is configured to be suitable for practicing the embodiments by providing a data processing unit 1612 that allows the user to create, edit, and maintain documents in a GUI environment.

The computer system 1600 includes a controller 1610, a memory 1620, storage 1630, a media device 1640, a user interface 1650, an input/output (I/O) interface 1660, and a network interface 1670. These components are interconnected by a common bus 1680. Alternatively, different connection configurations can be used, such as a star pattern with the controller at the center.

The controller 1610 is a programmable processor and controls the operation of the computer system 1600 and its components. The controller 1610 loads instructions from a computer-readable storage medium such as the memory 1620 or an embedded controller memory (not shown) and executes these instructions to control the system. In its execution, the controller 1610 provides an integrated document editor as a software system. Alternatively, this service can be implemented as separate components in the controller 1610 or the computer system 1600.

Memory 1620 stores data temporarily for use by the other components of the computer system 1600, such as for storing document structure information. In one embodiment, memory 1620 is implemented as RAM. In one embodiment, memory 1620 also includes long-term or permanent memory, such as flash memory and/or ROM.

Storage 1630 stores data temporarily or long term for use by the other components of the computer system 1600. In one embodiment, storage 1630 is a hard disk drive. Storage 1630 stores information for use by the data processing unit 1612, such as document content or document structure information. Storage 1630 also stores data generated by the data processing unit.

The media device 1640 receives removable media and reads and/or writes data to the inserted media. In one embodiment, the media device 1640 is an optical disc drive.

The user interface 1650 includes components for accepting user input from a user of the computer system 1600 and presenting information to the user. In one embodiment, the user interface 1650 includes a keyboard, a mouse, audio speakers, and a display. The controller 1610 uses input from the user to adjust the operation of the computer system 1600.

The I/O interface 1660 includes one or more I/O ports to connect to corresponding I/O devices, such as external storage or supplemental devices (e.g., a printer or a PDA). In one embodiment, the ports of the I/O interface 1660 include ports such as: USB ports, PCMCIA ports, serial ports, and/or parallel ports. In another embodiment, the I/O interface 1660 includes a wireless interface for communication with external devices wirelessly.

The network interface 1670 includes a wired and/or wireless network connection, such as an RJ-45 or "Wi-Fi" interface (802.11) supporting an Ethernet connection.

The computer system 1600 includes additional hardware and software typical of computer systems (e.g., power, cooling, operating system), though these components are not specifically shown in FIG. 16 for simplicity. In other embodiments, different configurations of the computer system can be used (e.g., different bus or storage configurations or a multi-processor configuration).

Exemplary embodiments have been described with reference to specific configurations. The foregoing description of specific embodiments and examples have been presented for the purpose of illustration and description only, and although the invention has been illustrated by certain of the preceding examples, it is not to be construed as being limited thereby.

What is claimed is:

1. A method of cellular computing by a graphical user interface generated by a computer system, the method comprising:
   storing within a memory a data structure comprising multiple cells, some cells of the multiple cells having one or more program instructions,
      wherein the multiple cells include a first cell and a second cell, each of the first cell and the second cell having a visual representation on the graphical user interface; and
   changing the memory to modify the data structure by a first adding a first program instruction and a third program instruction to the first cell, the first program instruction including a first textual identifier and causing the data structure to include a first value associated with the first textual identifier, and the third program instruction including a third textual identifier and causing the data structure to include a third value associated with the third textual identifier, the third textual identifier being different from the first textual identifier, and the third value being different from the first value,
      wherein, prior to the first adding, the data structure includes neither the first textual identifier nor the third textual identifier; and
   changing the memory to modify the data structure by a second adding a second program instruction to the second cell, the second program instruction referring to the first value in the data structure via the first textual identifier and referring to the third value in the data structure via the third textual identifier, the second program instruction computing a second value that is different from both the first value and the third value,
      wherein, in response to the second adding, the data structure includes a digital representation of a first relationship between the first cell and the second cell, the first relationship having a visual representation on the graphical user interface comprising a first graphical connection associating the visual representations of the first cell and the second cell,
      wherein, immediately prior to the second adding, the data structure does not include a digital representation of the first relationship between the first cell and the second cell.

2. The method of claim 1, wherein the data structure represents a canvas comprising the multiple cells.

3. The method of claim 1, wherein the data structure represents a grid comprising the multiple cells.

4. The method of claim 1, wherein the second program instruction refers to the first value exclusively via the first textual identifier, and the second program instruction refers to the third value exclusively via the third textual identifier, and
   wherein, in response to the second adding, the data structure includes a digital representation of a dependency between the first cell and the second cell, and
   wherein, immediately prior to the second adding, the data structure does not include a digital representation of a dependency between the first cell and the second cell.

5. The method of claim 4, wherein the data structure represents a grid comprising the multiple cells.

6. The method of claim 5, wherein the first value is a data structure representing multiple numerical values.

7. The method of claim 4, wherein after the first adding, the first cell comprises a first variable and a third variable, the first variable being associated with the first textual identifier and representing the first value, and the third variable being associated with the third textual identifier and representing the third value, the first textual identifier and the third textual identifier being user-specified textual identifiers, and wherein, in response to the second adding, the data structure includes a digital representation of a constraint to ensure that the first cell is executed prior to the second cell being executed, wherein, immediately prior to the second adding, the data structure does not include a digital representation of a constraint to ensure that the first cell is executed prior to the second cell being executed.

8. The method of claim 7, wherein the data structure represents a canvas comprising the multiple cells.

9. The method of claim 8, wherein the first value is a data structure representing multiple numerical values, and the first graphical connection extends from the visual representation of the first cell to the visual representation of the second cell on the graphical user interface.

10. The method of claim 9, wherein the second program instruction comprises an array arithmetic operation.

11. A method of cellular computing by a graphical user interface generated by a computer system, the method comprising:

storing within a memory a data structure comprising multiple cells, some cells of the multiple cells having one or more program instructions,
wherein the multiple cells include a first cell and a second cell, and changing the memory to modify the data structure by a first adding a first program instruction and a third program instruction to the first cell, the first program instruction causing the data structure to include a first value associated with a first user-specified textual identifier, and the third program instruction causing the data structure to include a third value associated with a third user-specified textual identifier, the third user-specified textual identifier being different from the first user-specified textual identifier, and the third value being different from the first value,
wherein, prior to the first adding, the data structure includes neither the first user-specified textual identifier nor the third user-specified textual identifier; and changing the memory to modify the data structure by a second adding a second program instruction to the second cell, the second program instruction referring to the first value in the data structure via the first user-specified textual identifier and referring to the third value in the data structure via the third user-specified textual identifier, the second program instruction computing a second value that is different from both the first value and the third value,
wherein, in response to the second adding, the data structure includes a digital representation of a dependency between the first cell and the second cell, and
wherein, immediately prior to the second adding, the data structure does not include a digital representation of a dependency between the first cell and the second cell.

12. The method of claim 11, wherein after the first adding, the first cell comprises a first variable and a third variable, the first variable being associated with the first user-specified textual identifier and representing the first value, the third variable being associated with the third user-specified textual identifier and representing the third value, and wherein the second program instruction refers to the first value exclusively via the first user-specified textual identifier and refers to the third value exclusively via the third user-specified textual identifier, and wherein, in response to the second adding, the data structure includes a digital representation of a constraint to ensure that the first cell is executed prior to the second cell being executed, wherein, immediately prior to the second adding, the data structure does not include a digital representation of a constraint to ensure that the first cell is executed prior to the second cell being executed.

13. The method of claim 12, wherein the data structure represents a canvas comprising the multiple cells.

14. The method of claim 12, wherein the first value is a data structure representing multiple numerical values.

15. The method of claim 14, wherein the data structure comprising multiple cells represents a grid comprising the multiple cells.

16. A method of cellular computing by a graphical user interface generated by a computer system, the method comprising:

storing within a memory a data structure comprising multiple cells, some cells of the multiple cells having one or more program instructions,
wherein the multiple cells include a first cell and a second cell, and changing the memory to modify the data structure by a first adding a first program instruction and a third program instruction to the first cell, the first program instruction causing the data structure to include a first value associated with a first user-specified textual identifier, and the third program instruction causing the data structure to include a third value associated with a third user-specified textual identifier, the third user-specified textual identifier being different from the first user-specified textual identifier, and the third value being different from the first value,
wherein, prior to the first adding, the data structure includes neither the first user-specified textual identifier nor the third user-specified textual identifier; and changing the memory to modify the data structure by a second adding a second program instruction to the second cell, the second program instruction referring to the first value in the data structure via the first user-specified textual identifier and referring to the third value in the data structure via the third user-specified textual identifier,
wherein, in response to the second adding, the data structure includes a digital representation of a constraint to ensure that the first cell is executed prior to the second cell being executed,
wherein, immediately prior to the second adding, the data structure does not include a digital representation of a constraint to ensure that the first cell is executed prior to the second cell being executed.

17. The method of claim 16, wherein the second program instruction refers to the first value exclusively via the first user-specified textual identifier, refers to the third value exclusively via the third user-specified textual identifier, and computes a second value that is different from both the first value and the third value, and wherein each of the first cell and the second cell have a visual representation on the graphical user interface, and in response to the second adding, a first graphical connection is displayed on the graphical user interface associating the visual representations of the first cell and the second cell.

18. The method of claim 17, wherein the data structure represents a canvas comprising the multiple cells.

19. The method of claim 17, wherein the data structure represents a grid comprising the multiple cells.

20. The method of claim 17, wherein the first value is a data structure representing multiple numerical values, and the first graphical connection extends from the visual representation of the first cell to the visual representation of the second cell on the graphical user interface.

* * * * *